(12) United States Patent
Nagai et al.

(10) Patent No.: US 12,330,849 B2
(45) Date of Patent: Jun. 17, 2025

(54) LIQUID REPELLENT LAYER-FORMING RESIN COMPOSITION, AND LIQUID REPELLENT FILM, LIQUID REPELLENT LAMINATE, PACKAGING MATERIAL, AND CONTAINER USING SAME

(71) Applicant: TOPPAN PRINTING CO., LTD., Tokyo (JP)

(72) Inventors: Aki Nagai, Tokyo (JP); Ryo Tanaka, Tokyo (JP); Kentaro Kimura, Tokyo (JP); Kosuke Kinoshita, Tokyo (JP); Hitomi Fukutake, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 0 days.

(21) Appl. No.: 17/277,218

(22) PCT Filed: Sep. 17, 2019

(86) PCT No.: PCT/JP2019/036405
§ 371 (c)(1),
(2) Date: Mar. 17, 2021

(87) PCT Pub. No.: WO2020/059717
PCT Pub. Date: Mar. 26, 2020

(65) Prior Publication Data
US 2021/0309428 A1    Oct. 7, 2021

(30) Foreign Application Priority Data

Sep. 21, 2018  (JP) .................................. 2018-177516
Sep. 21, 2018  (JP) .................................. 2018-177518
Mar. 5, 2019   (JP) .................................. 2019-039438

(51) Int. Cl.
*B65D 65/40*    (2006.01)
*B32B 7/12*     (2006.01)
(Continued)

(52) U.S. Cl.
CPC ................ *B65D 65/40* (2013.01); *B32B 7/12* (2013.01); *B32B 27/08* (2013.01); *B32B 27/18* (2013.01);
(Continued)

(58) Field of Classification Search
CPC .. B32B 27/32; B32B 5/02; B32B 5/16; B32B 27/08; B32B 27/12; B32B 27/20;
(Continued)

(56) References Cited

U.S. PATENT DOCUMENTS 4,293,608 A * 10/1981 Isaka ....................... B32B 27/18
                                                          428/517
4,565,738 A *  1/1986 Purdy ..................... B32B 27/08
                                                           525/88
(Continued)

FOREIGN PATENT DOCUMENTS

EP       3816225 A1    5/2021
JP    H08-337267 A    12/1996
(Continued)

OTHER PUBLICATIONS

International Search Report (Form PCT/ISA/210); mailed Dec. 10, 2019 in corresponding PCT Application No. PCT/JP2019/036405; (5 pages) (5 pages English Translation).
(Continued)

*Primary Examiner* — Tamra L. Dicus
(74) *Attorney, Agent, or Firm* — STAAS & HALSEY LLP

(57) ABSTRACT

A liquid-repellent layer forming resin composition comprises a polypropylene resin (A) and a silylated polyolefin (B), wherein the polypropylene resin (A) comprises a random polypropylene resin (A1) and a block polypropylene
(Continued)

resin (A2) with a mass ratio (Mass of random polypropylene resin (A1)/Mass of block polypropylene resin (A2)) in the range of 20/80 to 80/20.

6 Claims, 11 Drawing Sheets

(51) Int. Cl.
| | | |
|---|---|---|
| *B32B 27/08* | (2006.01) | |
| *B32B 27/18* | (2006.01) | |
| *B32B 27/28* | (2006.01) | |
| *B32B 27/32* | (2006.01) | |
| *C08L 23/26* | (2025.01) | |
| *C08L 53/00* | (2006.01) | |

(52) U.S. Cl.
CPC ............ *B32B 27/283* (2013.01); *B32B 27/32* (2013.01); *C08L 23/26* (2013.01); *C08L 53/00* (2013.01); *B32B 2270/00* (2013.01); *B32B 2307/7265* (2013.01); *B32B 2307/73* (2013.01); *B32B 2439/46* (2013.01); *C08L 2205/035* (2013.01); *C08L 2205/08* (2013.01)

(58) Field of Classification Search
CPC ...... B32B 2260/025; B32B 2264/1054; B32B 2264/303; B32B 2274/00; B32B 2307/102; B32B 2307/30; B32B 2307/732; B32B 2605/08; B32B 2264/104; B32B 2250/03; B32B 2262/0276; B32B 2266/0278; B32B 2270/00; B32B 2307/72; B32B 2471/02; B32B 2605/003; B32B 5/18; B32B 25/02; B32B 25/045; B32B 25/10; B32B 25/16; B32B 27/065; B32B 27/306; B32B 27/18; C08L 23/0815; C08L 101/00; C08K 3/013; C08K 3/30; C08K 2201/005; B60R 13/0838; B60Y 2306/09

See application file for complete search history.

(56) References Cited

U.S. PATENT DOCUMENTS

| | | | | |
|---|---|---|---|---|
| 5,708,083 | A * | 1/1998 | Kawamura | C08L 53/00 524/505 |
| 11,702,512 | B2 * | 7/2023 | Swier | C08G 77/045 525/106 |
| 2003/0032728 | A1 * | 2/2003 | Arhart | C08F 8/42 525/100 |
| 2006/0229399 | A1 * | 10/2006 | Panzer | C08L 23/10 524/502 |
| 2006/0235156 | A1 * | 10/2006 | Griswold | C08J 3/246 525/192 |
| 2013/0177720 | A1 * | 7/2013 | Liang | B32B 27/32 525/88 |
| 2015/0306852 | A1 * | 10/2015 | Fujiwara | B32B 1/02 428/141 |

FOREIGN PATENT DOCUMENTS

| | | | | |
|---|---|---|---|---|
| JP | 2013-023224 A | | 2/2013 | |
| JP | 2014223752 | * | 12/2014 | |
| JP | 2015025051 A | * | 2/2015 | |
| JP | 2017-125086 | * | 7/2017 | |
| WO | WO-2017159654 A1 | * | 9/2017 | ............ B32B 27/18 |
| WO | WO-2017159678 A1 | * | 9/2017 | ............ B29C 59/046 |

OTHER PUBLICATIONS

Written Opinion; Form PCT/ISA/237 mailed Dec. 10, 2019 in corresponding International Patent Application No. PCT/JP2019/036405; (5 pages) (9 pages English Translation).

Notification of Transmittal of Translation of International Preliminary Report on Patentability (Forms PCT/IB/338, PCT/IB/373); mailed Apr. 1, 2021 in corresponding International Patent Application No. PCT/JP2019/036405; (2 pages).

Extended European Search Report dated May 2, 2022 in European Patent Application No. 19862750.7 (8 pages).

* cited by examiner

LIQUID REPELLENT LAYER-FORMING RESIN COMPOSITION, AND LIQUID REPELLENT FILM, LIQUID REPELLENT LAMINATE, PACKAGING MATERIAL, AND CONTAINER USING SAME

CROSS REFERENCE TO RELATED APPLICATIONS

This application is a U.S. National Stage Application under 35 U.S.C. § 371 of PCT International Patent Application No. PCT/JP2019/036405, filed on Sep. 17, 2019, which claims the foreign priority benefit under 35 U.S.C. § 119 of Japanese Patent Application No. 2018-177516, filed on Sep. 21, 2018, Japanese Patent Application No. 2018-177518, filed on Sep. 21, 2018, Japanese Patent No. 2019-039438, filed on Mar. 5, 2019, all in the Japanese Patent Office, the contents of all of which International Patent Application and the three Japanese Patent Applications are incorporated by reference herein in their entirety.

TECHNICAL FIELD

The present disclosure relates to a liquid-repellent layer forming resin composition, and a liquid-repellent film, a liquid-repellent laminate, a packaging material, and a container using the same.

BACKGROUND ART

Conventionally, packaging materials corresponding to the contents of various products such as foods, beverages, pharmaceuticals, and chemicals have been developed. In particular, plastic materials excellent in water resistance, oil resistance, gas barrier properties, light weight, flexibility, design, etc., are used as packaging materials for contents such as liquids, semi-solids, and gel substances.

Also, as a packaging material for contents such as liquids, semi-solids and gel substances, a plastic laminate of multiple types of plastic base materials, a composite laminate of paper, metal foil, inorganic material or the like and a plastic base material, a composite of plastic base material treated with a functional composition, etc., have been proposed to provide higher functionality.

As one of the above-mentioned high functions, for example, a function of preventing the adhesion of contents such as a liquid, a semi-solid, or a gel substance to the inner surface of the packaging material, i.e., preventing the contents from remaining inside the packaging material, is required. More specifically, container lid materials for yogurt, jelly, and syrup, retort food packaging materials for porridge, soup, curry, and pasta sauce, and film materials for storage containers of liquids, semi-solids, gel substances of chemicals and pharmaceuticals, are required to have high liquid repellency capable of preventing the contents from adhering to the inner surface and ending up as waste without full use, preventing stains due to adhesion of the contents, and eliminating time-consuming discharging of the contents.

Responding to these requirements, for example, in Patent Literature 1, a water-repellent packaging material with an inner surface having a silicone resin composition layer containing hydrophobic fine particles such as silicone particles is proposed. Further, in Patent Literature 2, a packaging material having water repellency against contents and mold releasability, with a resin layer including spherical silicon as the innermost layer, is proposed.

CITATION LIST

Patent Literature

Patent Literature 1: Japanese Unexamined Patent Publication No. 2013-23224
Patent Literature 2: Japanese Unexamined Patent Publication No. H8-337267

SUMMARY OF INVENTION

Technical Problem

As a material for the resin layer of the inner surface of packaging materials, a polyolefin resin such as polyethylene and polypropylene is used to impart functions such as heat sealability, heat resistance, and impact resistance. Even a polyolefin resin adding the above silicone particles to impart liquid repellency, however, easily causes aggregation of the silicone particles in the resin layer and separation of the silicone particles from the resin layer, having insufficient effect to prevent the adhesion of contents to the inner surface of the packaging material.

In view of the conventional art having the above problems, it is an object of the present disclosure to provide a resin composition from which a liquid-repellent layer having excellent liquid repellency capable of sufficiently preventing adhesion of the contents can be formed, and a liquid-repellent film, a liquid-repellent laminate, a packaging material, and a container using the same.

Solution to Problem

In order to achieve the above objects, the present disclosure provides a liquid-repellent layer forming resin composition comprising a polypropylene resin (A) and a silylated polyolefin (B), wherein the above polypropylene resin (A) comprises a random polypropylene resin (A1) and a block polypropylene resin (A2) with a mass ratio (Mass of random polypropylene resin (A1)/Mass of block polypropylene resin (A2)) in the range of 20/80 to 80/20.

According to the above liquid-repellent layer forming resin composition, by the combination use of a polypropylene resin (A) and a silylated polyolefin (B) as a component for imparting liquid repellency to a liquid-repellent layer, with the polypropylene resin (A) comprising a random polypropylene resin (A1) and a block polypropylene resin (A2) with a mass ratio in the range of 20/80 to 80/20, a liquid-repellent layer having excellent liquid repellency capable of sufficiently preventing the adhesion of contents can be formed. The present inventors presume that the reason why the combination use of the random polypropylene resin (A1) and the block polypropylene resin (A2) with the above mass ratio exhibits the above effect as follows. Although a propylene resin (hereinafter, also referred to as "PP") is a hydrocarbon-based crystalline polymer, an amorphous portion is also present therein. On the other hand, an oil/fat contained in foods is a hydrocarbon compound, so that when a pouch filled with foods containing an oil/fat is subjected to heat treatment such as retort treatment, the amorphous portion having a low density in the PP contained in a liquid-repellent layer of the inner surface of the pouch tends to be swelled by the oil/fat. In contrast to this, the present inventors have found that through control of the mass ratio between the random PP (A1) and a block PP (A2), the crystallinity and melting point of the PP are controlled, so that the amount of oil swelling can be controlled. The present inventors have also found that through control of the above mass ratio, in forming of a liquid-repellent layer, the degree of precipitation of Si in the silylated polyolefin (B) on the surface of a liquid-repellent layer can be also controlled. According to the liquid-repellent layer forming resin composition of the present disclosure, through control of the mass ratio between the random PP (A1) and the block PP (A2) in the above range, both of reduction in the amount of oil swelling in the liquid-repellent layer to be formed and increase in the abundance of Si on the surface of the liquid-repellent layer can be achieved, so that excellent liquid repellency can be obtained. In the case where the proportion of the random PP (A1) is less than a mass ratio of 20/80, the crystallinity and melting point of the PP increase and Si is unlikely to precipitate on the surface the liquid-repellent layer, resulting in reduction in liquid repellency and increase in the amount of residual liquid. On the other hand, in the case where the proportion of the random PP (A1) is more than a mass ratio of 80/20, the crystallinity and melting point of the PP decrease, resulting in increase in the amount of oil swelling in the liquid-repellent layer. The increase in the amount of oil swelling in the liquid-repellent layer causes increase in the amount of residual liquid by that portion and segregation of a large amount of oil/fat on the surface of the liquid-repellent layer. As a result, Si is buried in the liquid-repellent layer to reduce the liquid repellency, so that the amount of residual liquid further increases.

In order to achieve the above objects, the present disclosure provides a liquid-repellent layer forming resin composition comprising a polypropylene resin (A) and a silylated polyolefin (B), wherein the above polypropylene resin (A) has two or more endothermic peaks in the range of 130 to 170° C. in a melting curve in a second heating process obtained under measurement conditions where the following steps (1) to (5) are carried out sequentially, in differential scanning calorimetry of a measurement specimen of a liquid-repellent layer formed by using the above liquid-repellent layer forming resin composition:

(1) heating to 200° C. at a heating rate of 10° C./min, as a first heating process;
(2) retaining at 200° C. for 5 minutes;
(3) cooling to 0° C. at a cooling rate of 100° C./min;
(4) retaining at 0° C. for 5 minutes; and
(5) heating to 200° C. at a heating rate of 10° C./min, as the second heating process.

According to the above liquid-repellent layer forming resin composition, due to the use of a polypropylene resin (A) and a silylated polyolefin (B) as a component for imparting liquid repellency to a liquid-repellent layer in combination, wherein the propylene resin (A) has two or more endothermic peaks in the range of 130 to 170° C. in the melting curve in the above second heating process, Si in the silylated polyolefin (B) easily segregates on the surface of the liquid-repellent layer, so that excellent liquid repellency capable of sufficiently preventing the adhesion of contents can be obtained. The present inventors presume the reason why the above effect is exhibited by the polypropylene resin (A) satisfying the above conditions as follows.

In the case where a polypropylene resin has only one endothermic peak in the range of 130 to 170° C. in the melting curve in the above second heating process, a single crystal phase is present to exhibit the following properties depending on the peak temperature. That is, in the case of a relatively low peak temperature, the polypropylene resin has a relatively low crystallinity, so that while Si in the silylated polyolefin (B) easily segregates on the surface of the liquid-repellent layer in forming of the liquid-repellent layer, the amount of oil swelling in the liquid-repellent layer to be formed increases. The increase in the amount of oil swelling causes increase in the amount of residual liquid by that portion and segregation of a large amount of oil/fat on the surface of the liquid-repellent layer. As a result, Si is buried in the liquid-repellent layer to reduce the liquid repellency, so that the amount of residual liquid further increases. On the other hand, in the case of a relatively high peak temperature, the polypropylene resin has a relatively high crystallinity, so that while the amount of oil swelling in the liquid-repellent layer to be formed can be reduced, Si is unlikely to segregate on the surface of the liquid-repellent layer, resulting in increase in the amount of residual liquid with reduction in the liquid repellency.

In contrast to this, the emergence of a plurality of endothermic peaks in the melting curve in the above second heating process means occurrence of fractional crystallization in the polypropylene resin. In other words, by cooling after the first heating process, a plurality of different crystal phases is formed in the polypropylene resin. Thereby, intermediate properties between those of the above polypropylene resins having only one endothermic peak at a relatively high temperature and at a relatively low temperature in the range of 130 to 170° C. can be exhibited. As a result, both of reduction in the amount of oil swelling in the liquid-repellent layer to be formed and increase in the abundance of Si on the surface of the liquid-repellent layer can be achieved, so that excellent liquid repellency can be obtained.

The above liquid-repellent layer forming resin composition may have a difference in the peak temperature of 10° C. or more between the endothermic peak on the highest temperature side and the endothermic peak on the lowest temperature side in the range of 130 to 170° C. in the melting curve in the above second heating process. A difference between the above peak temperatures of 10° C. or more allows to achieve both of reduction in the amount of oil swelling in the liquid-repellent layer to be formed and increase in the abundance of Si on the surface of the liquid-repellent layer at a higher level, so that more excellent liquid repellency can be obtained.

In the above liquid-repellent layer forming resin composition, the above polypropylene resin (A) may have one or more endothermic peaks in the range of 130° C. or more and less than 150° C., and one or more endothermic peaks in the range of 150° C. or more and 170° C. or less, in the melting curve in the above second heating process. Thereby, both of reduction in the amount of oil swelling in the liquid-repellent layer to be formed and increase in the abundance of Si on the surface of the liquid-repellent layer are achieved at a higher level, so that more excellent liquid repellency can be obtained.

In the above liquid-repellent layer forming resin composition, the above polypropylene resin (A) may comprise a first polypropylene resin and a second polypropylene resin having a melting point higher than that of the above first polypropylene resin by 10° C. or more. Inclusion of the first polypropylene resin and the second polypropylene resin having a melting point higher than that of the first polypropylene resin by 10° C. or more in a polypropylene resin (A) allows to achieve both of reduction in the amount of oil swelling in the liquid-repellent layer to be formed and increase in the abundance of Si on the surface of the liquid-repellent layer at a higher level, so that more excellent liquid repellency can be obtained.

In the above liquid-repellent layer forming resin composition, the above polypropylene resin (A) may comprise the above first polypropylene resin and the above second polypropylene resin with a mass ratio (Mass of first polypropylene resin/Mass of second polypropylene resin) in the range of 20/80 to 80/20. A mass ratio between the first and second polypropylene resins in the above range allows to achieve both of reduction in the amount of oil swelling in the liquid-repellent layer to be formed and increase in the abundance of Si on the surface of the liquid-repellent layer at a higher level, so that more excellent liquid repellency can be obtained.

In the above liquid-repellent layer forming resin composition, the above polypropylene resin (A) may comprise a random polypropylene resin (A1) and a block polypropylene resin (A2) with a mass ratio (Mass of random polypropylene resin (A1)/Mass of block polypropylene resin (A2)) in the range of 20/80 to 80/20. Inclusion of the random polypropylene resin (A1) and the block polypropylene resin (A2) with the above mass ratio in the polypropylene resin (A) allows to achieve both of reduction in the amount of oil swelling in the liquid-repellent layer to be formed and increase in the abundance of Si on the surface of the liquid-repellent layer at a higher level, so that more excellent liquid repellency can be obtained.

The above liquid-repellent layer forming resin composition may further comprise a compatibilizer (C) having a site compatible with the above polypropylene resin (A) and a site compatible with the above silylated polyolefin (B). By use of the compatibilizer (C), the dispersibility of the silylated polyolefin (B) is improved, so that liquid repellency can be more efficiently imparted to the liquid-repellent layer to be formed.

In the above liquid-repellent layer forming resin composition, the above compatibilizer (C) may comprise at least one selected from the group consisting of a block copolymer of propylene and ethylene and a block copolymer of ethylene and an ethylene-butylene copolymer. By using these compatibilizers (C), the dispersibility of the silylated polyolefin (B) is further improved, so that liquid repellency can be furthermore efficiently imparted to the liquid-repellent layer to be formed.

In the above liquid-repellent layer forming resin composition, the mass ratio of the content of the above compatibilizer (C) to the content of the above silylated polyolefin (B), (Mass of compatibilizer (C)/Mass of silylated polyolefin (B)), may be 0.05 to 20. With a content ratio in the above range, the dispersibility of the silylated polyolefin (B) is further improved, so that liquid repellency can be furthermore efficiently imparted to the liquid-repellent layer to be formed.

The above liquid-repellent layer forming resin composition may further comprise a silicone (D). By further comprising a silicone (D), the amount of Si present in the surface of the liquid-repellent layer to be formed can be increased, and thereby liquid repellency can be further improved.

The present disclosure also provides a liquid-repellent film having a liquid-repellent layer formed by using the liquid-repellent layer forming resin composition of the above present disclosure. The liquid-repellent film has the liquid-repellent layer formed by using the liquid-repellent layer forming resin composition of the above present disclosure, so that the adhesion of the contents to the liquid-repellent layer can be sufficiently prevented. Further, the above liquid-repellent film exhibits excellent liquid repellency against not only water and oil, but also against oil dispersed in water-type contents such as curry and pasta sauce.

In the above liquid-repellent film, the above liquid-repellent layer may have a crystallinity represented by the following equation (I) of 45 to 55%:

[Equation 1]

$$\text{Crystallinity (\%)} = ((\text{Peak area of crystal portion})/((\text{Peak area of crystal portion}) + (\text{Peak area of amorphous portion}))) \times 100 \quad (I)$$

A crystallinity of the liquid-repellent layer in the above range allows both of reduction in the amount of oil swelling in the liquid-repellent layer and precipitation of Si on the surface of the liquid-repellent layer to be achieved with a good balance, and the liquid repellency can be furthermore improved.

The above liquid-repellent film may further comprise one or more resin layers disposed on one main surface of the above liquid-repellent layer. The multi-layered structure of the liquid-repellent film having a resin layer other than the liquid-repellent layer enables to impart further functionalities (heat resistance, impact resistance, etc.) in addition to liquid repellency. Further, the liquid-repellent layer can be thinned with cost reduced.

In the case where the liquid-repellent film comprises a resin layer other than the liquid-repellent layer, the melting point $T_1$ (C) of the above polypropylene resin (A) in the above liquid-repellent layer and the melting point $T_2$ (° C.) of the resin contained in a resin layer in contact with the above liquid-repellent layer among the above one or more resin layers may satisfy a relation: $T_1 < T_2$. The satisfaction of the above relation enables to suppress the migration of the silylated polyolefin (B) in the liquid-repellent layer to the second resin layer from the viewpoint of the crystallinity so as to localize the silylated polyolefin (B) on the surface of the liquid-repellent layer or to improve the bleed-out efficiency, so that the liquid-repellency tends to be further improved.

The present disclosure also provides a liquid-repellent laminate comprising a base material and the liquid-repellent film of the above present disclosure disposed on the base material, wherein the above liquid-repellent layer is disposed on at least one outermost surface. The liquid-repellent laminate comprises the liquid-repellent film of the above present disclosure, so that the adhesion of the contents to the liquid-repellent layer can be sufficiently prevented. Further, lamination of the liquid-repellent film on a base material having a desired function enables to impart mechanical strength and functions such as barrier properties and light-shielding properties to the liquid-repellent laminate.

The above liquid-repellent laminate may be one having an amount of oil swelling per unit area of the liquid-repellent laminate of 1.0 mg/cm$^2$ or less after the liquid-repellent laminate in a bag shape with a liquid-repellent layer as an inner surface is filled with a cooking oil such that the oil comes in contact with the whole of the above inner surface, hermetically sealed, and subjected to heating and pressurization treatment with steam under conditions of a temperature of 121° C., a pressure of 0.2 MPa, and 30 minutes. The liquid-repellent laminate satisfying the conditions is able to have more excellent liquid repellency, enabling to prevent the adhesion of the contents more sufficiently.

The present disclosure also provides a packaging material formed by using the liquid-repellent laminate of the above present disclosure. The packaging material is formed by using the liquid-repellent laminate of the above present disclosure, so that the adhesion of the contents to the liquid-repellent layer can be sufficiently prevented.

The above packaging material may be one for use involving being subjected to heat treatment at 80° C. or more. According to the packaging material of the present embodiment, even in such a use, the adhesion of the contents to the inner surface of the packaging material can be prevented after heat treatment.

The present disclosure further provides a container having a liquid-repellent layer formed by using the resin composition of the above present disclosure at least on the inner surface. The container comprises the liquid-repellent layer formed by using the liquid-repellent layer forming resin composition of the above present disclosure, so that the adhesion of the contents to the liquid-repellent layer can be sufficiently prevented.

Advantageous Effects of Invention

According to the present disclosure, a resin composition from which a liquid-repellent layer having excellent liquid repellency capable of sufficiently preventing adhesion of the contents can be formed, and a liquid-repellent film, a liquid-repellent laminate, a packaging material, and a container using the same can be provided.

DESCRIPTION OF EMBODIMENTS

Figure 1:
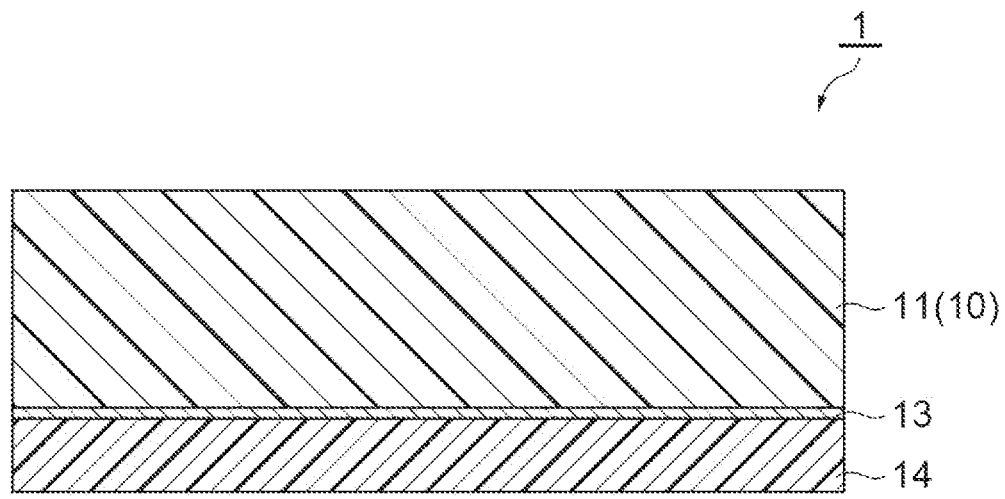
FIG. 1 is a schematic cross-sectional view showing a liquid-repellent laminate in an embodiment of the present disclosure.

The preferred embodiment of the present disclosure is described in detail with reference to drawings as follows. Incidentally, the same symbol is added to the same or equivalent part in the drawing, and redundant explanation is omitted. The dimensional ratio in the drawing is not limited to the proportion shown in the drawing.

[Liquid-Repellent Laminate]

Figure 2:
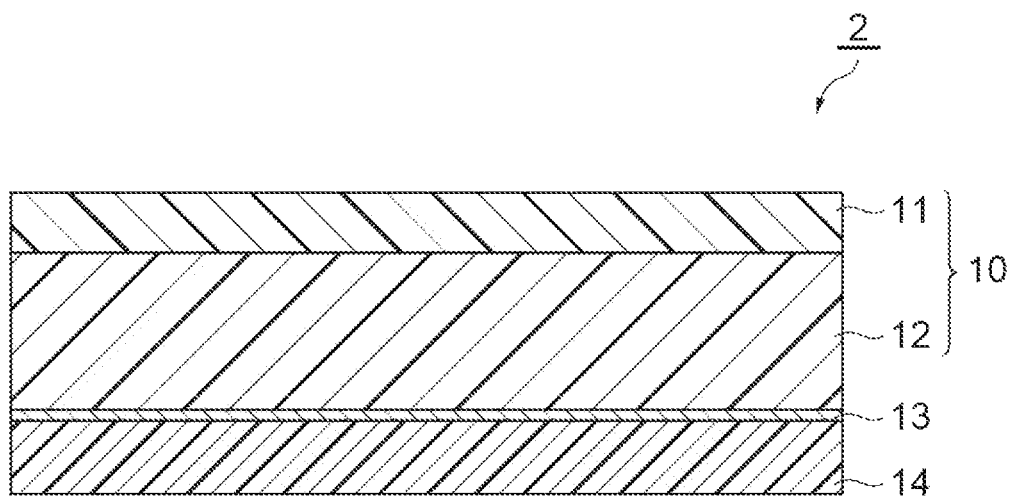
FIG. 2 is a schematic cross-sectional view showing a liquid-repellent laminate in an embodiment of the present disclosure.

The liquid-repellent laminate of the present embodiment comprises a base material and a liquid-repellent film disposed on the base material, and has a structure in which a liquid-repellent layer is disposed on at least one outermost surface. FIG. 1 and FIG. 2 are schematic cross-sectional views showing a liquid-repellent laminate of the present embodiment. The liquid-repellent laminate of the present embodiment may have a structure with a liquid-repellent film 10 consisting of a liquid-repellent layer 11 laminated with a base material 14 through an adhesive 13 as with a liquid-repellent laminate 1 shown in FIG. 1.

Alternatively, the liquid-repellent laminate of the present embodiment may have a structure with a liquid-repellent film 10 consisting of a liquid-repellent layer 11 and a second resin layer 12 laminated with a base material 14 through an adhesive 13 as with a liquid-repellent laminate 2 shown in FIG. 2. In the case where the liquid-repellent film 10 comprises the second resin layer 12, the second resin layer 12 is disposed to oppose the base material 14, such that the liquid-repellent layer 11 of the liquid-repellent film 10 is located at the outermost surface of the liquid-repellent laminate 2.

<Liquid-Repellent Layer 11>

The liquid-repellent layer 11 is a layer having liquid repellency. The liquid-repellent layer 11 may be a layer that can exhibit heat sealability by heating. In the present specification, the liquid repellency is a concept including both characteristics of water repellency and oil repellency, and specifically, being characteristics of repelling water-based or oil-based materials in a liquid state, semi-solid state or gel state. Examples of the water-based or oil-based materials include foods such as water, oil, yogurt, jelly, pudding, syrup, rice porridge, soup, curry, and pasta sauce, detergents such as hand soap and shampoo, pharmaceuticals, cosmetics and chemicals. The heat sealability refers to characteristics enabling heat sealing, for example, under conditions at 100 to 200° C., under 0.1 to 0.3 MPa, for 1 to 3 seconds. The conditions for heat sealing can be easily changed depending on the conditions required for heat sealing of a liquid-repellent laminate.

The thickness of the liquid-repellent layer 11 is preferably 0.1 to 100 µm, more preferably 1 to 70 µm, still more preferably 3 to 50 µm, particularly preferably 5 to 30 µm. With a thickness of the liquid-repellent layer 11 equal to or more than the above lower limit, excellent liquid repellency and heat sealability tend to be easily obtained. On the other hand, with a thickness equal to or less than the above upper limit, the total thickness of the liquid-repellent layer can be thinned.

The liquid-repellent layer 11 can be formed by using a liquid-repellent layer forming resin composition comprising the following components. The liquid-repellent layer forming resin composition is described as follows.

<Liquid-Repellent Layer Forming Resin Composition>

The liquid-repellent layer forming resin composition in an embodiment of the present disclosure contains a polypropylene resin (A) (hereinafter also referred to as "component (A)") and a silylated polyolefin (B) (hereinafter also referred to as "component (B)"). The above polypropylene resin (A) satisfies at least one condition of the following first and second conditions.

A first condition: The above polypropylene resin (A) comprises a random polypropylene resin (A1) and a block polypropylene resin (A2) with a mass ratio (Mass of random polypropylene resin (A1)/Mass of block polypropylene resin (A2)) in the range of 20/80 to 80/20.

A second condition: The above polypropylene resin (A) has two or more endothermic peaks in the range of 130 to 170° C. in a melting curve in a second heating process obtained under measurement conditions where the following steps (1) to (5) are carried out sequentially, in differential scanning calorimetry of a measurement specimen of a liquid-repellent layer formed by using the above liquid-repellent layer forming resin composition:

(1) heating to 200° C. at a heating rate of 10° C./min, as a first heating process;
(2) retaining at 200° C. for 5 minutes;
(3) cooling to 0° C. at a cooling rate of 100° C./min;
(4) retaining at 0° C. for 5 minutes; and
(5) heating to 200° C. at a heating rate of 10° C./min, as the second heating process.

The liquid-repellent layer forming resin composition in the present embodiment may further comprise one or both of a compatibilizer (C) having a site compatible with the above polypropylene resin (A) and a site compatible with the above silylated polyolefin (B) and a silicone (D).

(Polypropylene Resin (A))

Examples of the polypropylene resin (PP) include a homo polypropylene, a block polypropylene, a random polypropylene, and a copolymer of an α-olefin other than ethylene and propylene and propylene (propylene-based copolymer). Examples of the α-olefin component include 1-butene, 1-pentene, 1-hexene, 1-heptene, 1-octene, and 4-methyl-1-pentene. The block polypropylene in the present specification is different from an ethylene-propylene block copolymer which is a compatibilizer (C) described later, and generally has a structure with EPR (rubber component) and polyethylene dispersed in a homo polypropylene at the polymerization stage. By using such a polypropylene resin, the liquid-repellent laminate is able to be suitably used as packaging materials for retort foods subjected to heat treatment such as warming in hot water, easily preventing a bag-shaped packaging material from bursting during heat treatment such as warming in hot water.

In the present embodiment, the polypropylene resin satisfying the above first condition comprises at least a random polypropylene resin (A1) and a block polypropylene resin (A2) with a mass ratio (Mass of random polypropylene resin (A1)/Mass of block polypropylene resin (A2)) in the range of 20/80 to 80/20 (0.25 to 4.0). The above mass ratio is preferably 30/70 to 70/30 (0.43 to 2.3), more preferably 35/65 to 65/35 (0.54 to 1.9), still more preferably 40/60 to 60/40 (0.67 to 1.5). With a mass ratio equal to or more than the above lower limit, the crystallinity and melting point of the polypropylene resin can be sufficiently reduced, so that Si easily precipitates (segregates) on the surface of the liquid-repellent layer to be formed so as to improve the liquid repellency. On the other hand, with a mass ratio equal to or less than the above upper limit, the crystallinity and melting point of the polypropylene resin can be sufficiently increased, so that the amount of oil swelling in the liquid-repellent layer to be formed can be reduced. In the case where the amount of oil swelling in the liquid-repellent layer is low, both of reduction in the amount of residual liquid by that portion and reduction in the abundance of oil/fat on the surface of the liquid-repellent layer can be achieved, so that Si easily precipitates on the surface of the liquid-repellent layer to improve the liquid repellency. In the present embodiment, the polypropylene resin satisfying the above second condition has two or more endothermic peaks in the range of 130 to 170° C. in the melting curve in a second heating process in the measurement under the above conditions. The emergence of a plurality of the endothermic peaks in the melting curve in the second heating process means occurrence of fractional crystallization of the polypropylene resin. Examples of the method of fractional crystallization include blending of polypropylene resins having a different crystallinity. Thereby, different crystal phases can be formed through cooling after a first heating process. More specifically, examples the method include blending of a random polypropylene resin and a block polypropylene resin, blending of a random polypropylene resin and a homo polypropylene resin, blending of two or more random polypropylene resins having a different melting point, and blending of two or more block polypropylene resins having a different melting point.

It is preferable that the polypropylene resin satisfying the above second condition comprise a first polypropylene resin and a second polypropylene resin having a melting point higher than the melting point of the first polypropylene resin by 10° C. or more. The difference in the melting point between the second polypropylene resin and the first polypropylene resin is more preferably 15° C. or more, still more preferably 20° C. or more, particularly preferably 25° C. or more, extremely preferably 30° C. or more. With a difference in the melting point equal to or more than the above lower limit, both of reduction in the amount of oil swelling in the liquid-repellent layer to be formed and increase in the abundance of Si on the surface of the liquid-repellent layer can be achieved at a higher level, so that more excellent liquid repellency can be obtained. Incidentally, in the case where the polypropylene resin comprises three or more polypropylene resins, the difference in the melting point between the polypropylene resin having a highest melting point and the polypropylene having a lowest melting point in the above range is acceptable.

It is preferable that the polypropylene resin satisfying the above second condition comprise the above first polypropylene resin and the above second polypropylene resin with a mass ratio (Mass of first polypropylene resin/Mass of second polypropylene resin) in the range of 20/80 to 80/20 (0.25 to 4.0). The above mass ratio is more preferably 30/70 to 70/30 (0.43 to 2.3), still more preferably 35/65 to 65/35 (0.54 to 1.9), particularly preferably 40/60 to 60/40 (0.67 to 1.5). With a mass ratio equal to or more than the above lower limit, Si more easily segregates on the surface of the liquid-repellent layer to be formed, so that the liquid repellency can be further improved. On the other hand, with a mass ratio equal to or less than the above upper limit, the amount of oil swelling in the liquid-repellent layer to be formed can be further reduced. In the case where the amount of oil swelling in the liquid-repellent layer is low, both of reduction in the amount of residual liquid by that portion and reduction in the abundance of oil/fat on the surface of the liquid-repellent layer can be achieved, so that Si more easily precipitates on the surface of the liquid-repellent layer to further improve the liquid repellency.

It is preferable that the above first polypropylene resin be a random polypropylene resin (A1), and it is preferable that the above second polypropylene resin be a block polypropylene resin (A2). It may be confirmed that the polypropylene resin comprises a random polypropylene resin (A1) and a block polypropylene resin (A2) by infrared (IR) spectroscopic analysis of the resulting liquid-repellent layer.

In the melting curve in the above second heating process, the number of the endothermic curves observed in the range of 130 to 170° C. is 2 or more, or may be 3 or more. Also, the number of the above endothermic curves may be 5 or less, or may be 4 or less. In the case where the number of the endothermic curves is in the above range, the liquid-repellent layer to be formed has excellent liquid repellency.

In the melting curve in the above second heating process, a difference between the peak temperature of the endothermic peak on the highest temperature side and the peak temperature of the endothermic peak on the lowest temperature side in the range of 130 to 170° C. is preferably 10° C. or more, more preferably 15° C. or more, still more preferably 20° C. or more. A difference between the peak temperatures equal to or more than the above lower limit allows to achieve both of reduction in the amount of oil swelling in the liquid-repellent layer to be formed and increase in the abundance of Si on the surface of the liquid-repellent layer at a higher level, so that more excellent liquid repellency can be obtained.

It is preferable that the melting curve in the above second heating process have one or more endothermic peaks in the range of 130° C. or more and less than 150° C., and one or more endothermic peaks in the range of 150° C. or more and 170° C. or less. Thereby, both of reduction in the amount of oil swelling in the liquid-repellent layer to be formed and increase in the abundance of Si on the surface of the liquid-repellent layer can be achieved at a higher level, so that more excellent liquid repellency can be obtained.

The differential scanning calorimetry (DSC) may be performed in accordance with JIS K7121-1987 except that heating and cooling are performed under the conditions shown in the above (1) to (5). As the measurement specimen (test piece), a liquid-repellent layer formed of a film of liquid-repellent layer forming resin composition may be used. The polypropylene resin satisfying the above first condition and/or second condition may be a modified polypropylene modified with a predetermined acid. The modified polypropylene is obtained by graft-modifying a polypropylene with an unsaturated carboxylic acid derivative component derived from, for example, an unsaturated carboxylic acid, an unsaturated carboxylic acid anhydride, and an ester of an unsaturated carboxylic acid. Alternatively, modified polypropylenes such as a hydroxyl group-modified polypropylene and an acrylic-modified polypropylene may be also used as the polypropylene resin.

The random polypropylene resin (A1) and the block polypropylene resin (A2) described above may be used alone, or two or more thereof may be used in combination.

The liquid-repellent layer forming resin composition of the present embodiment may comprise a polyolefin resin other than the polypropylene resin. Examples of the other polyolefin resin include a low density polyethylene, a medium density polyethylene, a high density polyethylene, and an ethylene-α-olefin copolymer. Examples of the α-olefin component include 1-butene, 1-pentene, 1-hexene, 1-heptene, 1-octene, and 4-methyl-1-pentene. The copolymer may be a random copolymer or a block copolymer. In addition to the above, the polyolefin resin may be a cyclic polyolefin such as polynorbornene. The above polyolefin resin may be a linear polyolefin from the viewpoint of sealability and strength properties (tensile strength, impact strength, etc.), and the linear polyolefin may be in a linear form or a branched form.

The melting point of the polyolefin resin may be appropriately adjusted depending on the end use. For example, it is preferable that the melting point of the polyolefin resin for use as a packaging material for retort foods be 130 to 170° C.

The polyolefin resin may be a modified polyolefin modified with a predetermined acid. The modified polyolefin is obtained by graft-modifying a polyolefin with an unsaturated carboxylic acid derivative component derived from, for example, an unsaturated carboxylic acid, an unsaturated carboxylic acid anhydride, and an ester of an unsaturated carboxylic acid. Alternatively, modified polyolefins such as a hydroxyl group-modified polyolefin and an acrylic-modified polyolefin also may be used as the polyolefin resin.

One of the polyolefin resins described above may be used alone, or two or more thereof may be used in combination.

(Silylated Polyolefin (B))

The silylated polyolefin is a component to impart liquid repellency to the liquid-repellent layer 11. The silylated polyolefin includes a polyolefin unit having a silicone site.

Examples of the silylated polyolefin include a product manufactured by Dow Corning Toray Co., Ltd., as a PE-Si graft copolymer, Exfola manufactured by Mitsui Fine Chemicals, Inc., as a PE-Si block copolymer, and a product manufactured by Dow Corning Toray Co., Ltd., as a PP-Si graft copolymer.

As the silylated polyolefin, a block copolymer is more preferred than a graft copolymer from the viewpoint of further improving the liquid repellency of the liquid-repellent layer 11. The reason is that a block copolymer tends to be more easily localized or bleed out on the surface of the liquid-repellent layer 11.

One of the silylated polyolefins described above may be used alone, or two or more thereof may be used in combination.

The silylated polyolefin may have a polyolefin site compatible or not compatible (incompatible) with the polypropylene resin (A). In the case of using a silylated polyolefin having a polyolefin site incompatible with the polypropylene resin (A), however, use in combination with the following compatibilizer (C) is preferable. In the case of using a silylated polyolefin having a polyolefin site incompatible with the polypropylene resin (A), combination options for materials of the polypropylene resin (A) and the silylated polyolefin (B) increase, so that there exist advantages that design corresponding to a purpose and use is possible and liquid-repellency tends to be further improved. Examples of the silylated polyolefin having a polyolefin site compatible with the polypropylene resin (A) include a PP-Si graft copolymer, and examples of the silylated polyolefin having a polyolefin site incompatible with the polypropylene resin (A) include a PE-Si graft copolymer and a PE-Si block copolymer.

(Compatibilizer (C))

A compatibilizer is preferably used in the case where a silylated polyolefin having a polyolefin site incompatible with the polypropylene resin (A) is used as the silylated polyolefin (B). A compatibilizer is a component having a site compatible with the polypropylene resin (A) and a site compatible with the above silylated polyolefin (B). Use of the compatibilizer enables to improve the compatibility between the silylated polyolefin (B) having a polyolefin site incompatible with the polypropylene resin (A) and the polypropylene resin (A).

Examples of the site compatible with the polypropylene resin (A) include a polyolefin structure compatible with the polypropylene resin (A), preferably being a site having the same type of polyolefin structure as the polypropylene resin (A). In other words, it is preferable that the compatibilizer (C) has a polypropylene structure. Also, in the case where the polypropylene resin (A) is a copolymer consisting of two or more types of olefins such as a propylene-α-olefin copolymer, it is preferable that the compatibilizer (C) has at least a structure in which the same type of olefin as the main component olefin among olefins to constitute the above copolymer is polymerized or copolymerized.

Examples of the site compatible with the silylated polyolefin (B) include a polyolefin structure compatible with the polyolefin site of the silylated polyolefin (B), and a site having the same type of polyolefin structure as the polyolefin site of the silylated polyolefin (B) is preferred. In other words, in the case where the polyolefin site of the silylated polyolefin (B) has a polyethylene structure, it is preferable that the compatibilizer (C) has a polyethylene structure. Also, in the case where the polyolefin site of the silylated polyolefin (B) has a structure based on a copolymer consisting of two or more types of olefins such as an ethylene-α-olefin copolymer and a propylene-α-olefin copolymer, it is preferable that the compatibilizer (C) has at least a structure in which the same type of olefin as the main component olefin among olefins to constitute the above copolymer is polymerized or copolymerized.

As the compatibilizer (C), for example, a block copolymer constituting a polyethylene unit composed of a polyethylene or an ethylene-α-olefin copolymer and a polypropylene unit composed of a polypropylene or a propylene-α-olefin copolymer, or a block copolymer constituting a polyethylene unit and an ethylene-butylene copolymer unit may be used. Such a block copolymer may have any one of the structures of a diblock copolymer, a triblock copolymer, and a multiblock copolymer. In this case, the polypropylene resin (A) is compatible with a polypropylene site (polypropylene unit) or an ethylene-butylene copolymer site (ethylene-butylene copolymer unit) of the compatibilizer (C), and a polyethylene site (polyethylene unit) of the silylated polyolefin (B) is compatible with a polyethylene site (polyethylene unit) of the compatibilizer (C).

One type of the above compatibilizers may be used alone, or two or more types thereof may be used in combination.
(Silicone (D))

Silicone is a component to further improve the liquid repellency of the liquid-repellent layer 11. Examples of the silicone include a silicone oil, a silicone resin, a silicone oligomer, and a silicone powder.

Among them, a silicone oil is preferred since more excellent liquid repellency tends to be easily obtained.

Examples of the silicone oil include a dimethyl silicone oil, a methylphenyl silicone oil, a methyl hydrogen silicone oil, a cyclic dimethyl silicone oil, an alkyl-modified silicone oil, a long-chain alkyl-modified silicone oil, and a higher fatty acid-modified silicone oil.

Examples of the silicone oil include products manufactured by Asahi Kasei Wacker Silicone Co., Ltd., products manufactured by Shin-Etsu Chemical Co., Ltd., products manufactured by Momentive Performance Materials, Inc., and products manufactured by Dow Corning Toray Co., Ltd.

Examples of the silicone resin include products manufactured by Shin-Etsu Chemical Co., Ltd., and products manufactured by Asahi Kasei Wacker Silicone Co., Ltd.

Examples of the silicone oligomer include products manufactured by Shin-Etsu Chemical Co., Ltd., and products manufactured by Dow Corning Toray Co., Ltd.

Examples of the silicone powder include products manufactured by Shin-Etsu Chemical Co., Ltd., and products manufactured by Dow Corning Toray Co., Ltd.

One of the silicones described above may be used alone, or two or more thereof may be used in combination.

The content of the component (A) in the liquid-repellent layer forming resin composition is preferably 50.0 to 99.9 mass %, more preferably 55.0 to 99.0 mass %, still more preferably 60.0 to 98.0 mass %, relative to the total solid content of the liquid-repellent layer forming resin composition. With a content of the component (A) equal to or more than the above lower limit, excellent heat sealability tends to be easily obtained. On the other hand, in the case where the content of the component (A) is equal to or less than the above upper limit, the content of the component (B) and the content of the component (C) and the component (D) that are used on an as needed basis relatively increase, so that the liquid repellency tends to be improved.

The total content of the component (B) and the component (C) in the liquid-repellent layer forming resin composition is preferably 0.1 to 50.0 mass %, more preferably 1.0 to 45.0 mass %, still more preferably 2.0 to 40.0 mass %, relative to the total solid content of the liquid-repellent layer forming resin composition. With a total content of the component (B) and the component (C) equal to or more than the above lower limit, liquid repellency tends to be easily improved. On the other hand, with a total content of the component (B) and the component (C) equal to or less than the above upper limit, the content of the component (A) increases relatively, so that the excellent heat sealability tends to be easily obtained.

In the case where the liquid-repellent layer forming resin composition comprises the component (C), the mass ratio of the content of the component (C) to the content of the component (B), (Mass of component (C)/Mass of component (B)), may be 0.01 to 50, preferably 0.04 to 30, more preferably 0.05 to 20, still more preferably 0.05 to 15. With a content ratio equal to or more than the above lower limit, the silylated polyolefin (B) is sufficiently dispersed in the liquid-repellent layer, so that more excellent liquid repellency tends to be obtainable. On the other hand, with a content ratio equal to or less than the above upper limit, the silylated polyolefin (B) is prevented from being covered with the excessive compatibilizer (C), so that more excellent liquid-repellency tends to be obtainable. Also, even with addition of the compatibilizer (C) with a content ratio of more than the above upper limit, the silylated polyolefin (B) is not further dispersed, so that the effect to improve the liquid repellency tends to disappear.

In the case where the liquid-repellent layer forming resin composition comprises the component (D), the content is preferably 0.1 to 20.0 mass %, more preferably 1.0 to 15.0 mass %, still more preferably 2.0 to 10.0 mass %, relative to the total amount of the liquid-repellent layer forming resin composition. With a total content of the component (D) equal to or more than the above lower limit, the liquid repellency tends to be easily improved. On the other hand, with a total content of the component (D) equal to or less than the above upper limit, the content of the component (A) increases relatively, so that excellent heat sealability tends to be easily obtained. Also, with a content of the component (D) of more than the above upper limit, separation of the component (D) from the liquid-repellent layer tends to easily occur.

The liquid-repellent layer forming resin composition may comprise other additives on an as needed basis, within a range not to impair the liquid repellency. Examples of the other additives include flame retardants, slip agents, antiblocking agents, antioxidants, light stabilizers, and tackifiers.

The liquid-repellent layer 11 may be formed by forming a film of the liquid-repellent layer forming resin composition.

The liquid-repellent layer 11 may have a crystallinity represented by the following equation (I) of 45 to 55%, which is measured by X-ray diffraction under conditions of an incident angle of 0.5° and a measurement angle of 3 to 35°. The X-ray diffraction measurement may be performed by the parallel method using CuKα radiation as X-ray source. The peak areas of the crystal portion and the amorphous portion may be calculated from the measured X-ray diffraction spectrum using an analysis software. Through the X-ray diffraction measurement by the parallel method with the above incident angle and measurement angle, the crystallinity of the liquid-repellent layer 11 near the surface, which has a large impact on the liquid repellency, may be measured. With a crystallinity of the liquid-repellent layer 11 of 45% or more, oil is unlikely to be introduced into the liquid-repellent layer 11, so that the amount of oil swelling can be reduced, resulting in further reduction in the amount of residual liquid. With a crystallinity of the liquid-repellent layer 11 of 55% or less, it is difficult to inhibit the precipitation of Si on the surface of the liquid-repellent layer 11, so that Si segregates on the surface and liquid repellency tends to further improve. Incidentally, the crystallinity of the liquid-repellent layer 11 of the present specification is measured before heat treatment such as retort treatment. The crystallinity of the liquid-repellent layer 11 may be measured in a state of the liquid-repellent film 10 or in a state of the liquid-repellent laminate 1. Although the crystallinity of the liquid-repellent layer 11 measured in the state of the liquid-repellent laminate 1 may change from the crystallinity measured in the state of the liquid-repellent film 10 in some cases due to the additional amount of heat applied to the liquid-repellent film 10 during preparation of the liquid-repellent laminate 1, it is preferable that the crystallinity be in the range of 45 to 55% in measurement in any one of the state. Alternatively, the crystallinity may be measured by differential scanning calorimetry, or infrared spectroscopy, other than X-ray diffraction.

[Equation 2]

$$\text{Crystallinity (\%)} = ((\text{Peak area of crystal portion})/((\text{Peak area of crystal portion}) + (\text{Peak area of amorphous portion}))) \times 100 \quad \text{(I)}$$

The crystallinity of the liquid-repellent layer 11 may be controlled by the composition of the polypropylene resin (A), the amount of heat applied to the liquid-repellent layer 11, etc. In the case of control by the composition of the polypropylene resin (A), as the block polypropylene resin (A2) has a higher crystallinity than the random polypropylene resin (A1), the crystallinity can be increased by increasing the proportion of the block polypropylene resin (A2). On the other hand, examples of the method for controlling the amount of heat include controlling the film formation conditions of the liquid-repellent layer 11. Specific examples of the film formation include the line speed, the film formation temperature, the cooling temperature, and the cooling method. For example, in the case of controlling the cooling temperature, the crystallinity may be improved by gradual cooling with an increased cooling temperature.

<Second Resin Layer 12>

The second resin layer 12 is a layer disposed between the liquid-repellent layer 11 and the base material 14, in order to improve the heat sealability, heat resistance, the impact resistance, oxygen/water vapor barrier properties, etc. It is preferable that the second resin layer 12 comprise a thermoplastic resin having heat sealability.

The thermoplastic resin used for the second resin layer 12 is not particularly limited, and examples thereof include a polyolefin resin, an ethylene-α, β-unsaturated carboxylic acid copolymer or an esterified product or an ionically cross-linked product thereof, an ethylene-vinyl acetate copolymer or a saponified product thereof, a polyvinyl acetate or saponified product thereof, a polycarbonate resin, a thermoplastic polyester resin, an ABS resin, a polyacetal resin, a polyamide resin, a polyphenylene oxide resin, a polyimide resin, a polyurethane resin, a polylactic acid resin, a furan resin, and a silicone resin. One of these thermoplastic resins may be used alone or two or more thereof may be used in combination.

It is preferable that the thermoplastic resin described above fur use in the second resin layer 12 comprise a polyolefin resin for easy improvement in heat sealability, heat resistance and impact resistance. As the polyolefin resin, one similar to the polypropylene resin (A) for use in the liquid-repellent layer 11 may be used.

In the case where the second resin layer 12 is in contact with the liquid-repellent layer 11, it is preferable that the melting point $T_1$ (° C.) of the polypropylene resin (A) in the liquid-repellent layer 11 and the melting point $T_2$ (° C.) of the above thermoplastic resin in the second resin layer 12 satisfy a relation: $T_1 < T_2$. The satisfaction of the above relation enables to suppress the migration of the silylated polyolefin (B) in the liquid-repellent layer 11 to the second resin layer 12 from the viewpoint of the degree of crystallinity so as to localize the silylated polyolefin (B) on the surface of the liquid-repellent layer 11 or to improve the bleed-out efficiency, so that the liquid-repellency tends to be further improved. From the same viewpoint, the melting point $T_2$ is higher than the melting point $T_1$ preferably by 1° C. or more, more preferably by 3° C. or more.

The melting point $T_1$ is the melting point of the polypropylene resin (A) measured in the liquid-repellent layer 11 as measurement specimen. Also, the melting point $T_2$ is the melting point of the resin measured in the second resin layer 12 as measurement specimen. In the case where the liquid-repellent layer 11 contains two or more polypropylene resins having a different melting point as the polypropylene resin (A), the melting point $T_1$ represents the melting point of a polypropylene resin that melts at the lowest temperature in the liquid-repellent layer 11. The melting point $T_1$, however, is affected by other polypropylene resins, being different from the measured melting point of a single polypropylene resin. The melting point $T_1$ of the polypropylene resin (A) in the liquid-repellent layer 11 and the melting point $T_2$ of the resin in the second resin layer 12 may be measured by a thermal analyzer (e.g., TA7000 manufactured by Hitachi High-Tech Science Corporation).

The thickness of the second resin layer 12 may be appropriately set depending on the end use of a commercial product made from the liquid-repellent layer forming resin composition. For example, the thickness of the second resin layer 12 is preferably 0.1 to 300 μm, more preferably 1 to 200 μm, still more preferably 5 to 150 μm, particularly preferably 10 to 100 μm.

<Liquid-Repellent Film 10>

The liquid-repellent film 10 having liquid repellency is formed of a single layer of the liquid-repellent layer 11 or two layers of the liquid-repellent layer 11 and the second resin layer 12 described above. The liquid-repellent film 10 is formed to cover a part or the whole of the surface of the base material 14. Incidentally, the liquid-repellent film 10 may be used alone, without lamination to the base material 14 depending on use.

The liquid-repellent film 10 may further comprise one or more resin layers other than the liquid-repellent layer 11 and the second resin layer 12. The composition of the other resin layers may be the same as the composition of the second resin layer 12 or may be different therefrom.

<Base Material 14>

The base material 14 is not particularly limited as long as it can be used as a support, and examples thereof include paper, a resin film, and a metal foil. Examples of the paper include wood-free paper, wood-free specialty paper, coated paper, art paper, cast-coated paper, imitation vellum, and kraft paper. Examples of the resin film include a film comprising at least one of polyolefin (e.g. polyethylene (PE) and polypropylene (PP)), acid-modified polyolefin, polyester (e.g. polyethylene terephthalate (PET)), polyamide (PA), polyvinyl chloride (PVC), cellulose acetate, and cellophane resin. The film may be a stretched film or an unstretched film. Examples of the metal foil include an aluminum foil and a nickel foil. The base material 14 may be a laminate of a plurality of base materials made of different materials.

The thickness of the base material 14 may be appropriately adjusted depending on use without particular limitation, being usually 1 to 500 μm, preferably 10 to 100 μm.

Examples of the method for laminating the base material 14 with the liquid-repellent film 10 include a lamination method using an adhesive and a lamination method by heat treatment to be described below, though not limited thereto.

(Lamination Method Using Adhesive)

As the lamination method using an adhesive, various known lamination method such as dry laminating, wet laminating and non-solvent laminating may be used. Examples of the adhesive 13 for use in these lamination methods include the following.

<Adhesive 13>

The adhesive 13 bonds the liquid-repellent film 10 to the base material 14. Examples of the adhesive 13 include a polyurethane resin obtained by reacting a bifunctional or higher functional isocyanate compound with a main agent such as polyester polyol, polyether polyol, acrylic polyol, and carbonate polyol. One of the various polyols described above may be used alone, or two or more thereof may be used in combination.

To the adhesive 13 of the polyurethane resin described above, a carbodiimide compound, an oxazoline compound, an epoxy compound, a phosphorus compound, a silane coupling agent, or the like may be further added for the purpose of facilitating adhesion.

Alternatively, depending on the performance required for the adhesive 13, other various additives or stabilizers may be added to the polyurethane resin described above.

The thickness of the adhesive 13 is, for example, preferably 1 to 10 μm, more preferably 3 to 7 μm, from the viewpoint of obtaining a desired adhesion strength, followability, processability, etc., though not particularly limited thereto.

(Lamination Method by Heat Treatment)

The laminating methods by heat treatment are roughly classified into the following methods.

(1) A method in which an adhesive resin is extruded between a liquid-repellent film 10 formed in advance and a base material 14 so as to be laminated.
(2) A method in which a resin layer including a liquid-repellent film 10 and an adhesive resin are coextruded so as to be laminated with a base material 14.
(3) A method in which the laminated base material obtained by the above method (1) or (2) is then bonded by heating and pressing with a hot roll.
(4) A method in which the laminated base material obtained by the above method (1) or (2) is then stored in a high temperature atmosphere or passed through a drying/baking furnace in a high temperature atmosphere.

Examples of the adhesive resin for use in the lamination method by heat treatment include an acid-modified polyolefin. Although the base material 14 and the liquid-repellent film 10 are laminated by extrusion lamination in the method described above, it is also possible to perform lamination by applying an acid-modified polyolefin-based coating agent (dissolving-type or dispersion type) onto the base material 14 in advance and then heat-treating the liquid-repellent film 10 without performing extrusion lamination.

It is also possible to dispose an adhesive primer (anchor coating) on the base material 14, as the material thereof, it is possible to use polyester, polyurethane, polyallylamine, polyethyleneimine, polybutadiene, an ethylene-vinyl acetate copolymer, chlorine-vinyl acetate, etc. To the adhesive primer, various curing agents and additives usable as the adhesive 13 may be added on an as needed basis.

It is preferable that the liquid-repellent laminate of the present embodiment have an amount of oil swelling per unit area of the liquid-repellent laminate of 1.0 $mg/cm^2$ or less after the liquid-repellent laminate in a bag shape with a liquid-repellent layer as an inner surface is filled with a cooking oil such that the oil comes in contact with the whole of the above inner surface, hermetically sealed, and subjected to heating and pressurization treatment with steam under conditions of a temperature of 121° C., a pressure of 0.2 MPa, and 30 minutes. With an amount of oil swelling thus measured of 1.0 $mg/cm^2$ or less, the liquid-repellent laminate is able to have more excellent liquid repellency, enabling to further reduce the amount of residual liquid after discharge of the contents. From the same viewpoint, it is more preferable that the above amount of oil swelling be 0.95 $mg/cm^2$ or less. On the other hand, from the viewpoint of enhancing slidability of the contents, the liquid-repellent layer may be swelled to some extent by the oil/fat, and the above amount of oil swelling may be 0.5 $mg/cm^2$ or more.

[Packaging Material]

The packaging material in the present embodiment is formed by using the liquid-repellent laminate described above. Examples of the packaging material include container lid materials for yogurt, jelly, and syrup, retort food packaging materials (retort pouch) for porridge, soup, curry, and pasta sauce. The packaging material is formed such that the liquid-repellent layer is disposed inside the packaging material (contents side), so that the contents such as liquids, semi-solids, and gel materials are prevented from adhering to the inside of the packaging material or remaining thereon. Also, a bag-shaped packaging material such as a packaging material for retort foods causes blocking of the innermost layers of the packaging material with each other, so that the contents are unlikely to be discharged in some cases. However, the packaging material in the present embodiment is unlikely to cause blocking of the liquid-repellent layers as innermost layers with each other, so that it is possible to efficiently discharge the contents.

The above packaging material may be one for use involving being subjected to heat treatment at 80° C. or more. Specifically, the packaging material may be for use as packaging materials for retort foods, subjected to heat treatment such as warming in hot water. Even when the packaging material in the present embodiment is used for such a use, the contents are prevented from adhering to the inside of the packaging material or remaining thereon after heat treatment.

[Container]

The container in the present embodiment is a container having the liquid-repellent layer formed by using the liquid-repellent layer forming resin composition described above at least on the inner surface (contents side). Specific examples of the container include a storage container of liquids, semi-solids, gel materials of chemicals and pharmaceuticals and a bottle accommodating hand soap, shampoo, etc. The container is formed such that the liquid-repellent layer is disposed on the inner surface (contents side) of the container, so that the contents such as liquids, semi-solids and gel materials are prevented from adhering to the inside of the container or remaining thereon.

EXAMPLES

The present disclosure is described in more detail based on Examples and Comparative Examples as follows, though the present disclosure is not limited to Examples described below.

Example 1

<Preparation of Liquid-Repellent Layer Forming Resin Composition>

A random polypropylene resin (A1) (propylene-ethylene random copolymer, trade name "Prime Polypro", manufactured by Prime Polymer Co., Ltd., melting point: 134° C. (catalog value), hereinafter abbreviated as "r-PP" in some cases) and a block polypropylene resin (A2) (propylene-ethylene block copolymer, trade name "Novatec", manufactured by Japan Polypropylene Corporation, melting point: 165 to 166° C. (catalog value), hereinafter abbreviated as a "b-PP" in some cases) as the component (A) and a silylated polyethylene (a block copolymer of PE-Si, manufactured by Dow Corning Toray Co., Ltd., hereinafter abbreviated as "PE-Si" in some cases) as the component (B) were mixed to prepare a liquid-repellent layer forming resin composition. The content of each of the components was adjusted to a mass ratio between r-PP and b-PP in the component (A) (Mass of r-PP/Mass of b-PP) of 20/80 and 5 mass % of the component (B) with a balance of the component (A) based on the total amount of the component (A) and the component (B).

<Preparation of Liquid-Repellent Laminate>

Using a three-layer coextrusion machine, a liquid-repellent layer forming resin composition was extruded to form a liquid-repellent film consisting of a liquid-repellent layer having a thickness of 60 µm. The resulting liquid-repellent film and a PET film (trade name "Emblet", manufactured by Unitika Ltd.) having a thickness of 38 µm as base material were dry laminated using a polyurethane adhesive (manufactured by Mitsui Chemicals, Inc.), and aged at 50° C. for 5 days to obtain a liquid-repellent laminate.

Examples 2 to 5

A liquid-repellent layer forming resin composition, a liquid-repellent film, and a liquid-repellent laminate were prepared in the same manner as in Example 1, except that the mass ratio between r-PP and b-PP in the component (A) in the liquid-repellent layer forming resin composition was changed as indicated in Table 1.

Examples 6 to 15

A liquid-repellent layer forming resin composition, a liquid-repellent film, and a liquid-repellent laminate were prepared in the same manner as in Example 1, except that a block copolymer of ethylene and an ethylene-butylene copolymer (hereinafter abbreviated as "PE-Et/Bu" in some cases) as component (C) was further added to the liquid-repellent layer forming resin composition to adjust the content of each of the components. In the liquid-repellent layer forming resin composition, the mass ratio between r-PP and b-PP in the component (A), and the contents of the component (B) and the component (C) based on the total amount of the component (A), the component (B) and the component (C) were adjusted to their respective values indicated in Table 1.

Examples 16 to 42

A liquid-repellent layer forming resin composition, a liquid-repellent film, and a liquid-repellent laminate were prepared in the same manner as in Example 1, except that a block copolymer of propylene and ethylene (hereinafter abbreviated as "PP-PE" in some cases) as component (C) was further added to the liquid-repellent layer forming resin composition to adjust the content of each of the components. In the liquid-repellent layer forming resin composition, the mass ratio between r-PP and b-PP in the component (A), and the contents of the component (B) and the component (C) based on the total amount of the component (A), the component (B) and the component (C) were adjusted to their respective values indicated in Table 1.

Examples 43 to 51

A liquid-repellent layer forming resin composition, a liquid-repellent film, and a liquid-repellent laminate were prepared in the same manner as in Example 16, except that a silicone oil (dimethyl silicone, manufactured by Dow Corning Toray Co., Ltd.) (hereinafter abbreviated as "silicone" in some cases) as the component (D) was further added to the liquid-repellent layer forming resin composition to adjust the content of each of the components. In the liquid-repellent layer forming resin composition, the mass ratio between r-PP and b-PP in the component (A), and the contents of the component (B), the component (C) and the component (D) based on the total amount of the component (A), the component (B), the component (C) and the component (D) were adjusted to their respective values indicated in Table 2.

Example 52

<Preparation of Liquid-Repellent Layer Forming Resin Composition>

A liquid-repellent layer forming resin composition was prepared in the same manner as in Example 3.

<Preparation of Liquid-Repellent Laminate>

A random polypropylene resin (A1) (propylene-ethylene random copolymer, trade name "Prime Polypro", manufactured by Prime Polymer Co., Ltd., melting point: 134° C. (catalog value)) as component (A) was used as a second liquid-repellent layer forming resin composition. Using a three-layer coextrusion machine, the liquid-repellent layer forming resin composition and the second resin layer forming resin composition were coextruded to form a liquid-repellent film consisting of a liquid-repellent layer having a thickness of 15 µm and a second resin layer having a thickness of 45 µm. The second resin layer of the resulting liquid-repellent film and a PET film (trade name "Emblet", manufactured by Unitika Ltd.) having a thickness of 38 µm as base material were dry laminated using a polyurethane adhesive (manufactured by Mitsui Chemicals, Inc.) to obtain a liquid-repellent laminate.

Examples 53 to 70

A liquid-repellent layer forming resin composition, a second liquid-repellent layer forming resin composition, a liquid-repellent film and a liquid-repellent laminate were prepared in the same manner as in Example 52, except that the component (C) or the component (C) and the component (D) indicated in Table 2 were added to a content indicated in the Table to adjust the mass ratio between r-PP and b-PP in the component (A) to the value indicated in the Table.

Examples 71 to 75

A liquid-repellent layer forming resin composition, a second liquid-repellent layer forming resin composition, a liquid-repellent film and a liquid-repellent laminate were prepared in the same manner as in Example 52, except that the mass ratio between r-PP and b-PP in the component (A) in the liquid-repellent layer forming resin composition was changed as indicated in Table 2 and a block polypropylene resin (A2) (propylene-ethylene block copolymer, trade name "Novatec", manufactured by Japan Polypropylene Corporation, melting point: 165 to 166° C. (catalog value)) as component (A) was used as the second liquid-repellent layer forming resin composition.

Examples 76 to 119

A liquid-repellent layer forming resin composition, a second liquid-repellent layer forming resin composition, a liquid-repellent film and a liquid-repellent laminate were prepared in the same manner as in Example 71, except that the component (C) or the component (C) and the component (D) indicated in Table 2 and Table 3 were added to a content indicated in the Tables to adjust the mass ratio between r-PP and b-PP in the component (A) to the value indicated in the Table.

Comparative Example 1

A liquid-repellent layer forming resin composition, a liquid-repellent film and a liquid-repellent laminate were prepared in the same manner as in Example 3, except that component (B) was not added to the liquid-repellent layer forming resin composition.

Comparative Examples 2 to 5

A liquid-repellent layer forming resin composition, a liquid-repellent film and a liquid-repellent laminate were prepared in the same manner as in Example 1, except that the mass ratio between r-PP and b-PP in the component (A) in the liquid-repellent layer forming resin composition was changed as indicated in Table 4.

Comparative Example 6

A liquid-repellent layer forming resin composition, a liquid-repellent film and a liquid-repellent laminate were prepared in the same manner as in Example 8, except that the component (B) was not added to the liquid-repellent layer forming resin composition.

Comparative Examples 7 to 10

A liquid-repellent layer forming resin composition, a liquid-repellent film and a liquid-repellent laminate were prepared in the same manner as in Example 6, except that the mass ratio between r-PP and b-PP in the component (A) in the liquid-repellent layer forming resin composition was changed as indicated in Table 4.

Comparative Example 11

A liquid-repellent layer forming resin composition, a liquid-repellent film and a liquid-repellent laminate were prepared in the same manner as in Example 18, except that the component (B) was not added to the liquid-repellent layer forming resin composition.

Comparative Examples 12 to 15

A liquid-repellent layer forming resin composition, a liquid-repellent film and a liquid-repellent laminate were prepared in the same manner as in Example 16, except that the mass ratio between r-PP and b-PP in the component (A) in the liquid-repellent layer forming resin composition was changed as indicated in Table 4.

Comparative Examples 16 to 19

A liquid-repellent layer forming resin composition, a liquid-repellent film and a liquid-repellent laminate were prepared in the same manner as in Example 45, except that the mass ratio between r-PP and b-PP in the component (A) in the liquid-repellent layer forming resin composition was changed as indicated in Table 4.

Comparative Examples 20 and 21

A liquid-repellent layer forming resin composition, a liquid-repellent film and a liquid-repellent laminate were prepared in the same manner as in Example 52, except that the component (B) was not added to the liquid-repellent layer forming resin composition and the mass ratio between r-PP and b-PP in the component (A) was changed as indicated in Table 4.

Comparative Examples 22 to 25

A liquid-repellent layer forming resin composition, a liquid-repellent film and a liquid-repellent laminate were prepared in the same manner as in Example 57, except that the mass ratio between r-PP and b-PP in the component (A) in the liquid-repellent layer forming resin composition was changed as indicated in Table 4.

Comparative Examples 26 to 29

A liquid-repellent layer forming resin composition, a liquid-repellent film and a liquid-repellent laminate were prepared in the same manner as in Example 65, except that the mass ratio between r-PP and b-PP in the component (A) in the liquid-repellent layer forming resin composition was changed as indicated in Table 4.

Comparative Examples 30 to 33

A liquid-repellent layer forming resin composition, a liquid-repellent film and a liquid-repellent laminate were prepared in the same manner as in Example 102, except that the mass ratio between r-PP and b-PP in the component (A)

in the liquid-repellent layer forming resin composition was changed as indicated in Table 4.

Comparative Examples 34 to 37

A liquid-repellent layer forming resin composition, a liquid-repellent film and a liquid-repellent laminate were prepared in the same manner as in Example 114, except that the mass ratio between r-PP and b-PP in the component (A) in the liquid-repellent layer forming resin composition was changed as indicated in Table 4.

Example 3α

As an example having an enhanced crystallinity of the liquid-repellent layer in Example 3, Example 3α was performed. In Example 3α, a liquid-repellent layer forming resin composition, a liquid-repellent film and a liquid-repellent laminate were prepared in the same manner as in the above Example 3, except that during formation of the liquid-repellent layer, the surface temperature of the cooling roll for cooling the liquid-repellent layer extruded into a film was increased to gradually cool the liquid-repellent layer at a slower rate.

Examples 8α to 119α and 101β

As examples having an enhanced crystallinity of the liquid-repellent layer, Example 8α to 119α and 101β shown in Table 5 and Table 6 were performed. In these examples, the change is that the liquid-repellent layer was gradually cooled at a slower rate than that in examples having the same number without a subscript, in the same manner as in Examples 3α. Incidentally, in Example 101β, the cooling temperature during cooling of the liquid-repellent layer was further increased than in Example 101α in order to gradually cool the liquid-repellent layer at a further slower rate. In Table 5 and Table 6, examples having the same number without a subscript α or β are also described for comparison purposes.

In Tables 1 to 6, the mass ratio of the content of the component (C) to the content of the component (B), (Mass of component (C)/Mass of component (B)), in the liquid-repellent layer is shown. Also, in Tables 1 to 6, the magnitude relation between the melting point $T_1$ (° C.) of the resin as component (A) measured in the liquid-repellent layer and the melting point $T_2$ (° C.) of the resin as component (A) used in the second resin layer is shown. In the case where the liquid-repellent layer contains r-PP and b-PP as the component (A), $T_1$ representing the melting point of r-PP that melts at low temperature in the liquid-repellent layer is affected by b-PP, being different from the measured melting point of the single r-PP. The melting point $T_1$ of the component (A) in the liquid-repellent layer and the melting point $T_2$ of the resin in the second resin layer were measured by a thermal analyzer (TA7000 manufactured by Hitachi High-Tech Science Corporation).

[Evaluation on Liquid Repellency]
<Evaluation on Residual Liquid after Retort Treatment>

Figure 3:
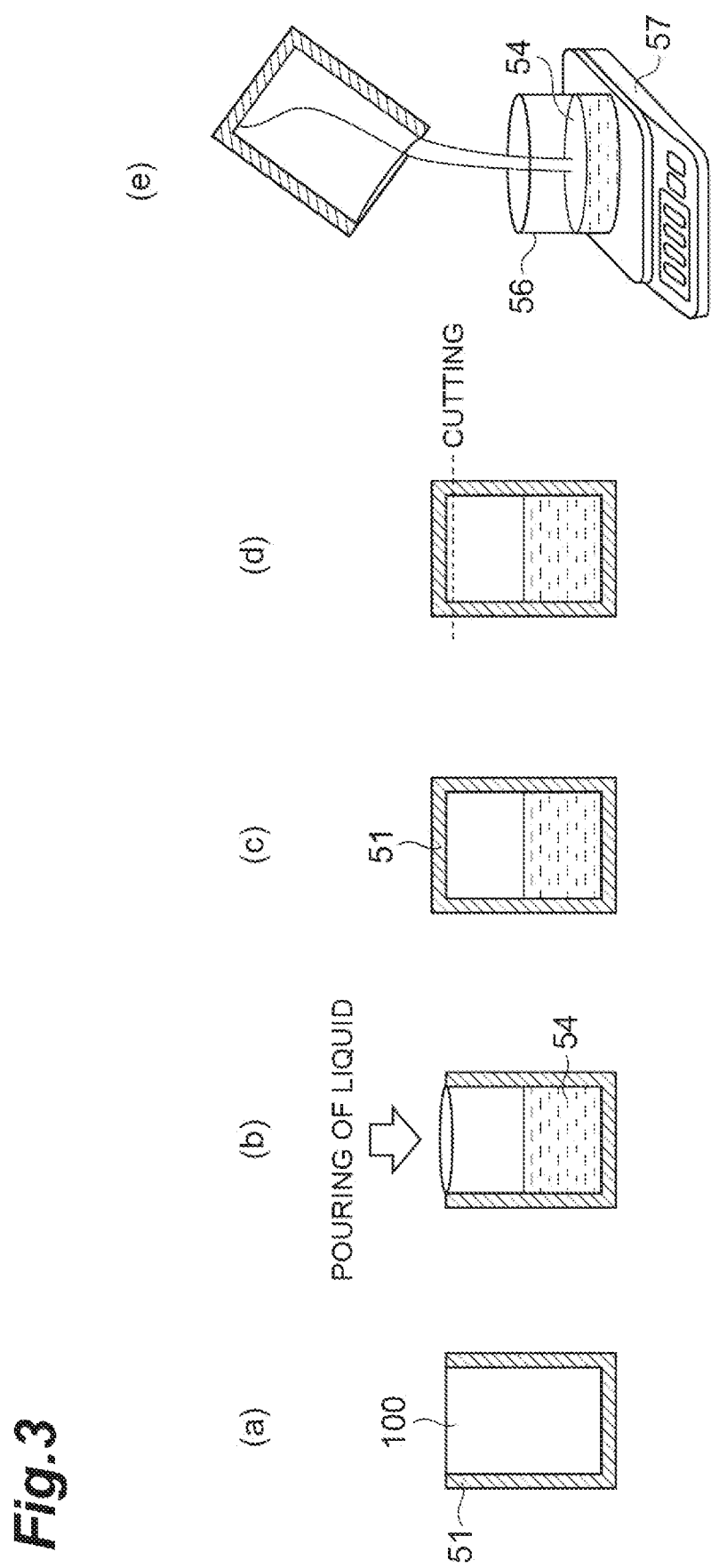
FIG. 3 is a schematic view illustrating the evaluation method of liquid repellency of a liquid-repellent laminate.

The liquid-repellent laminates obtained in Examples and Comparative Examples were subjected to evaluation on liquid repellency after retort treatment by the method shown in FIG. 3. First, two sheets of samples 100 were prepared by cutting the liquid-repellent laminate into a length of 150 mm and a width of 138 mm. The two sheets of the samples 100 were superimposed such that each of the liquid-repellent layers was located inside. One edge side in the longitudinal direction and both two edge sides in the width direction were heat sealed over a width of 10 mm with a heat sealer under conditions of 190° C., 0.03 MPa, and 2 seconds to form a seal part 51, so that a pouch with an edge side in the longitudinal direction open was prepared (refer to FIG. 3(a)). Subsequently, 180 g of an oil dispersed in water-type liquid 54 (trade name: "Bon Curry Gold, medium spicy", manufactured by Otsuka Foods Co., Ltd., amount of fat: 7.0 g in 180 g) was poured through the opening of the pouch (refer to FIG. 3(b)). The opening was then heat sealed over a width of 10 mm with a heat sealer under conditions of 190° C., 0.03 MPa, and 2 seconds to form a seal part 51, so that the pouch was hermetically sealed (refer to FIG. 3(c)).

The hermetically sealed pouch placed in a high-temperature high-pressure cooking sterilizer (manufactured by Hitachi Capital Corporation) was subjected to retort treatment with a high-temperature steam under a condition of a pressure of 0.2 MPa, at 121° C. for 30 minutes, and further subjected to warming in hot water at 100° C. for 5 minutes. Immediately after the above treatment, the upper part of the hermetically sealed pouch was cut to form a spout (refer to FIG. 3(d)). Subsequently, the pouch was turned upside down and held for 10 seconds with the spout inclined at 45° from the horizontal plane to discharge the oil dispersed in water-type liquid 54 into a container 56, and the amount discharged (g) was weighed with a scale 57 (refer to FIG. 3(e)). From the measured amount discharged, the amount of residual liquid (%) was obtained by the following equation.

$$\text{Amount of residual liquid (\%)} = \{(180 - \text{Amount discharged})/180\} \times 100$$

The measurement was performed 3 times, and the residual liquid was evaluated from the average amount of residual liquid of the 3 measurements based on the following evaluation criteria. The evaluation results are shown in Tables 1 to 6. The amount of residual liquid (average amount of residual liquid) is also shown in Table 5 and Table 6.
A: The average amount of residual liquid is 6.5% or less.
B: The average amount of residual liquid is more than 6.5% and 8.0% or less.
C: The average amount of residual liquid is more than 8.0% and 10.0% or less.
D: The average amount of residual liquid is more than 10.0%.

<Evaluation on Appearance after Retort Treatment>
In the above evaluation on the residual liquid, when the liquid was discharged from inside the pouch, the discharge behavior of the liquid was visually observed to perform evaluation on appearance based on the following evaluation criteria. The results are shown in Table 1 to Table 6.
A: A state of clearly repelling liquid is observed, and adhesion to the liquid-repellent laminate is extremely scarce.
B: A state of repelling liquid is observed, and adhesion to the liquid-repellent laminate is scarce.
C: Although a state of repelling liquid is observed, adhesion to the liquid-repellent laminate is present.
D: A state of repelling liquid is not observed.

[Measurement of Amount of Oil Swelling]
A part of the liquid-repellent laminates obtained in Examples and Comparative Examples was subjected to measurement of the amount of oil swelling by the following method. First, two sheets of samples were prepared by cutting the liquid-repellent laminate into a length of 150 mm and a width of 138 mm. The two sheets of the samples were superimposed such that each of the liquid-repellent layers was located inside. One edge side in the longitudinal direction and both two edge sides in the width direction were heat sealed over a width of 10 mm with a heat sealer under conditions of 190° C., 0.03 MPa, and 2 seconds to form a seal part, so that a pouch with an edge side in the longitudinal direction open was prepared. Subsequently, 100 g of a cooking oil (trade name: "Nisshin Salad Oil", manufactured by The Nisshin Oillio Group, Ltd.) was poured through the opening of the pouch. The opening was then heat sealed over a width of 10 mm with a heat sealer under conditions of 190° C., 0.03 MPa, and 2 seconds to form a seal part, so that the pouch was hermetically sealed. The pouch was hermetically sealed while degassing, such that the cooking oil comes in contact with the whole of the inner surface of the pouch. The hermetically sealed pouch placed in a high-temperature high-pressure cooking sterilizer (manufactured by Hitachi Capital Corporation) was subjected to retort treatment with a high-temperature steam under a condition of a pressure of 0.2 MPa, at 121° C. for 30 minutes. After the retort treatment, the cooking oil filling in the pouch was discharged, and the pouch was washed with a detergent. The weight of the pouch after drying ($W_1$) (unit: g) was then measured. From the weight of the pouch after retort treatment ($W_1$) and the weight of the pouch before pouring of the cooking oil ($W_0$) (unit: g), the amount of oil swelling per unit area of the liquid-repellent laminate (unit: mg/cm$^2$) was determined based on the following equation.

Amount of oil swelling($mg/cm^2$)={($W_1-W_0$)/(13× 11.8×2)}×1000

[Measurement of crystallinity]

Figure 4:
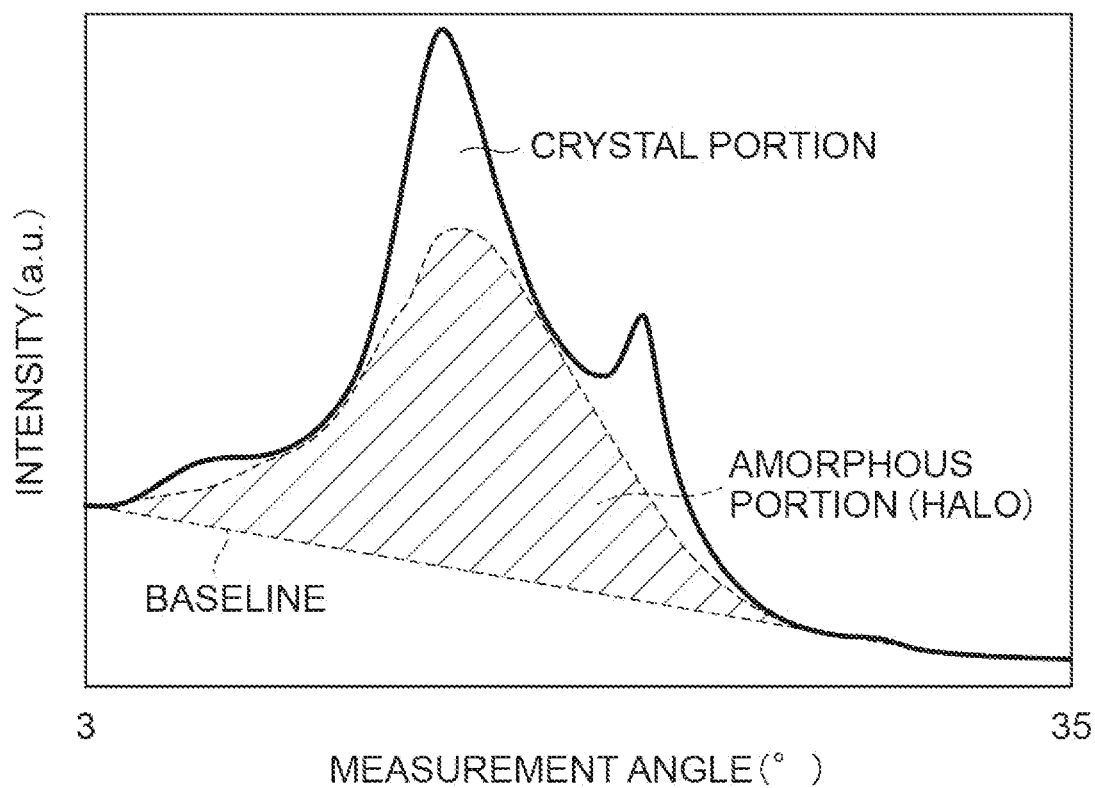
FIG. 4 is a graph showing an X-ray diffraction spectrum of a liquid-repellent layer in a liquid-repellent film obtained in Example 101.
Figure 5:
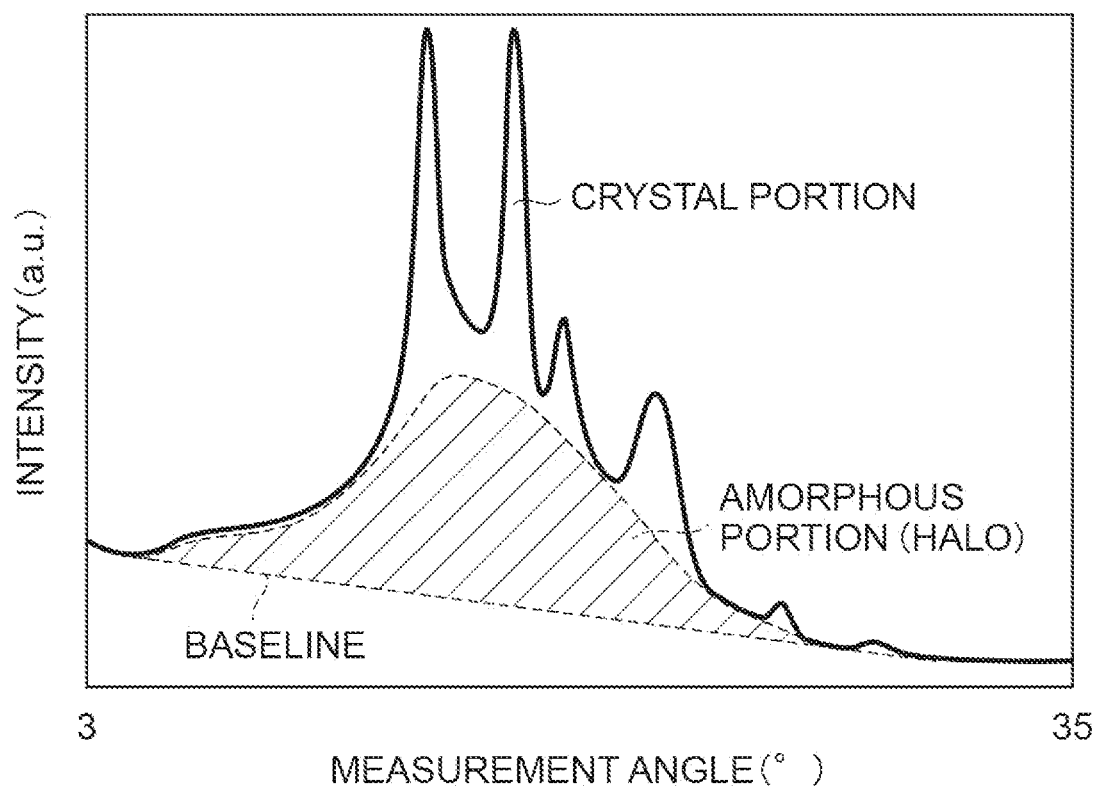
FIG. 5 is a graph showing an X-ray diffraction spectrum of a liquid-repellent layer in a liquid-repellent film obtained in Example 101α.
Figure 6:
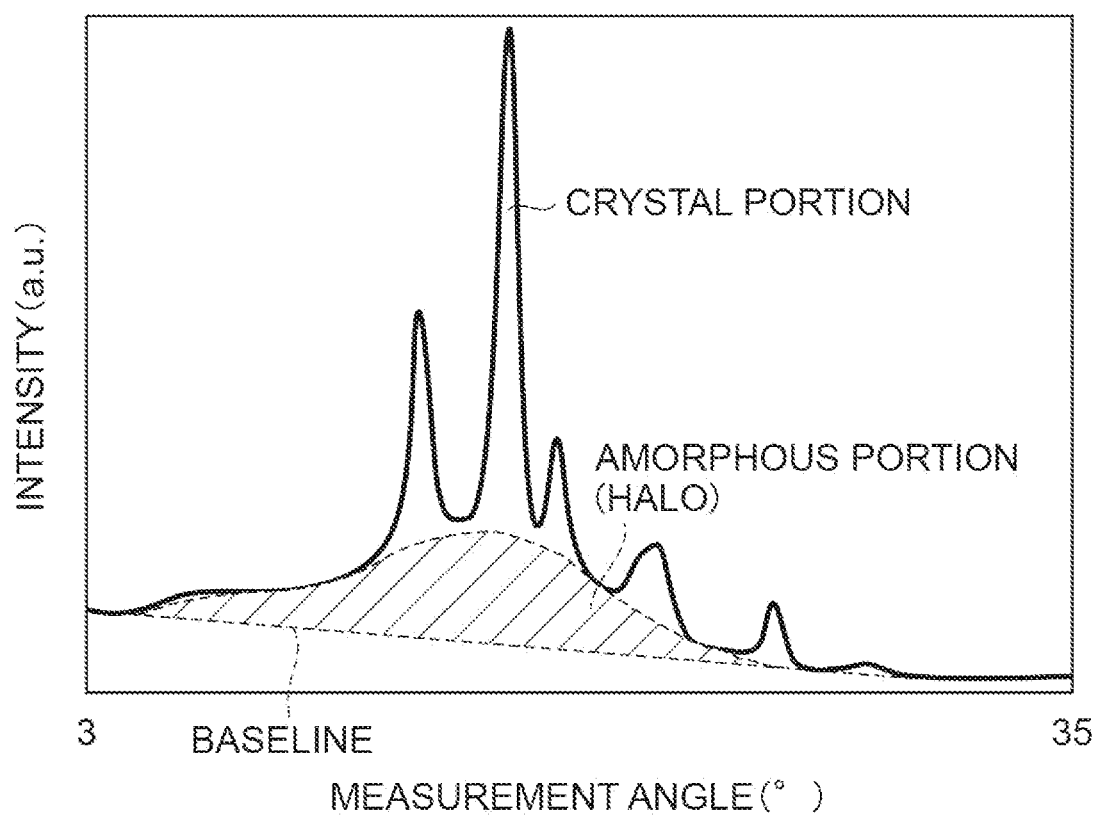
FIG. 6 is a graph showing an X-ray diffraction spectrum of a liquid-repellent layer in a liquid-repellent film obtained in Example 101β.
Figure 7:
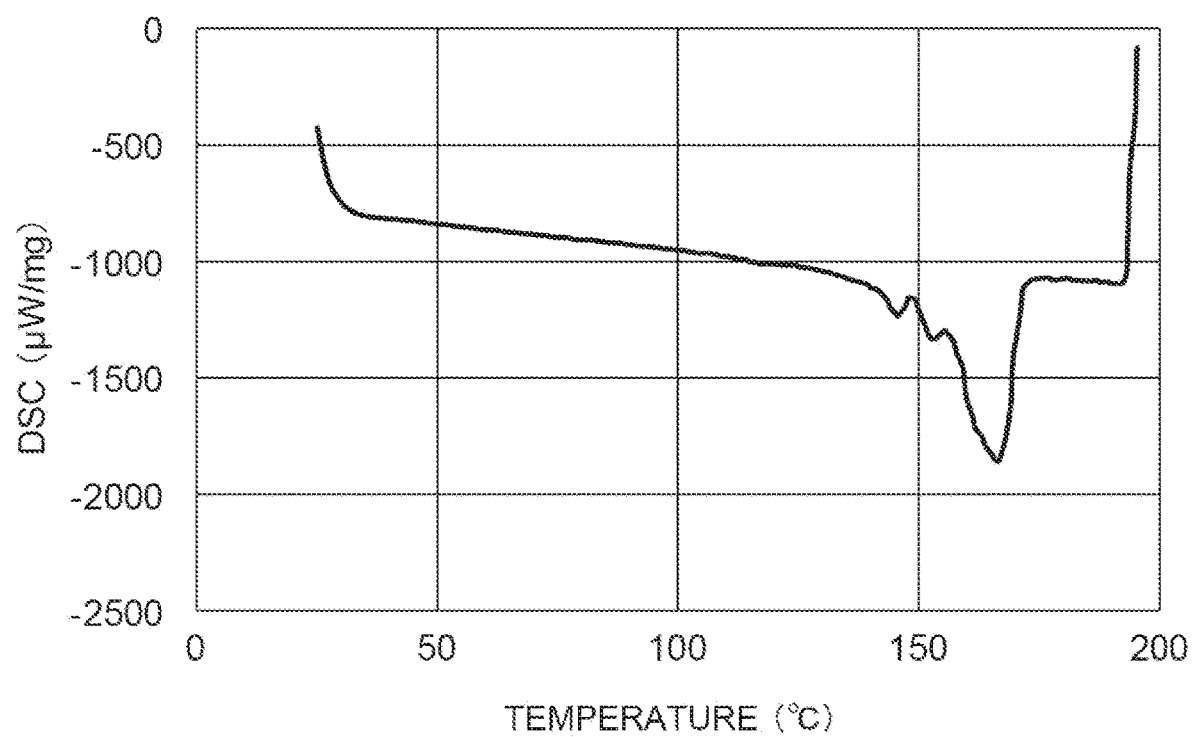
FIG. 7 is a chart showing a melting curve of a liquid-repellent layer obtained in Example 201 in a second heating process.
Figure 8:
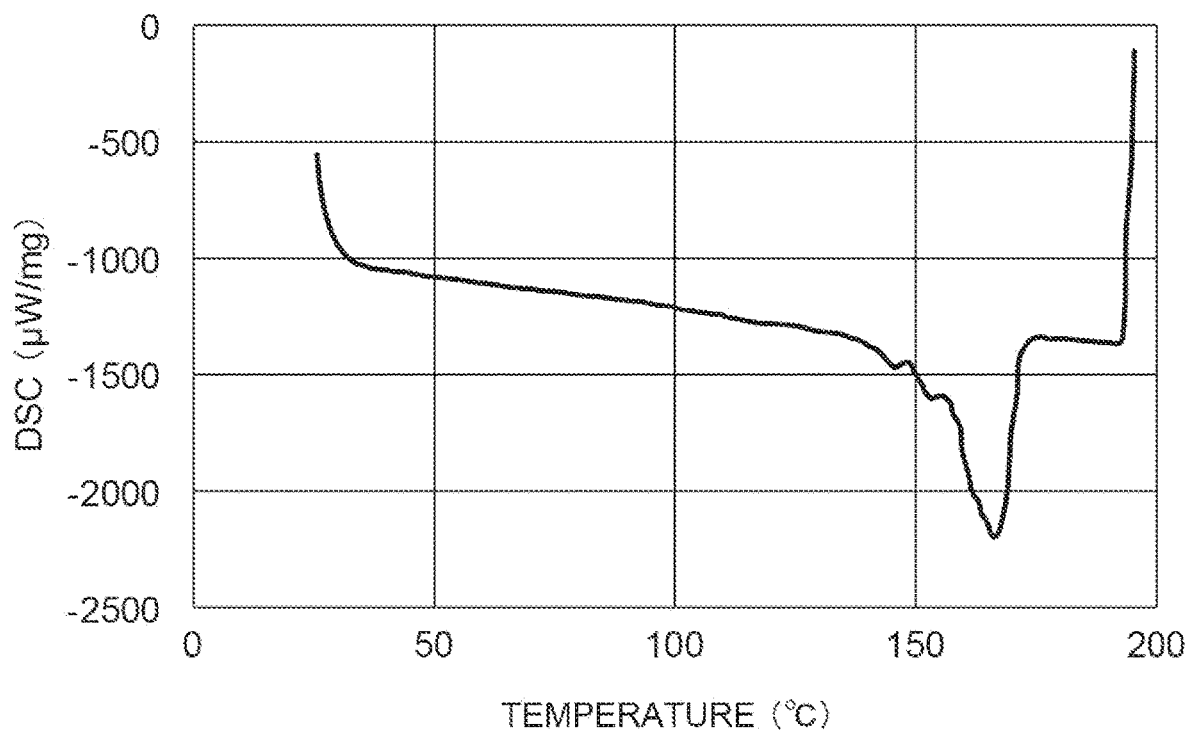
FIG. 8 is a chart showing a melting curve of a liquid-repellent layer obtained in Example 202 in a second heating process.
Figure 9:
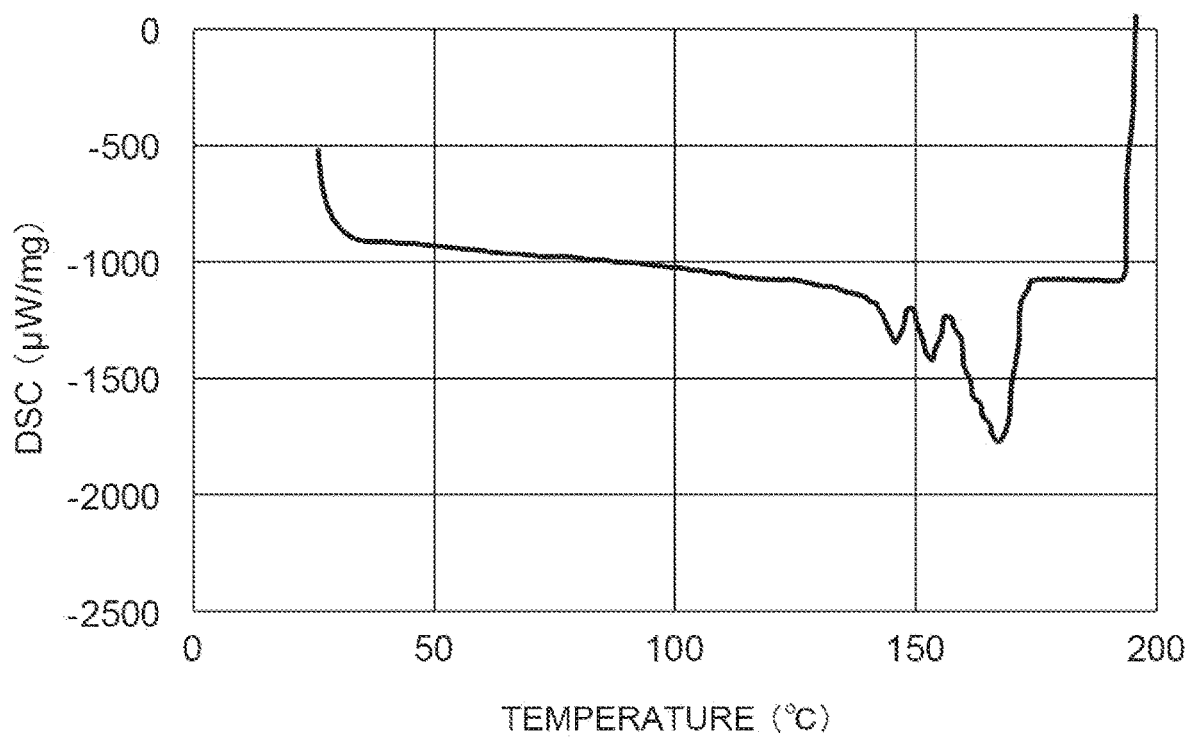
FIG. 9 is a chart showing a melting curve of a liquid-repellent layer obtained in Example 203 in a second heating process.
Figure 10:
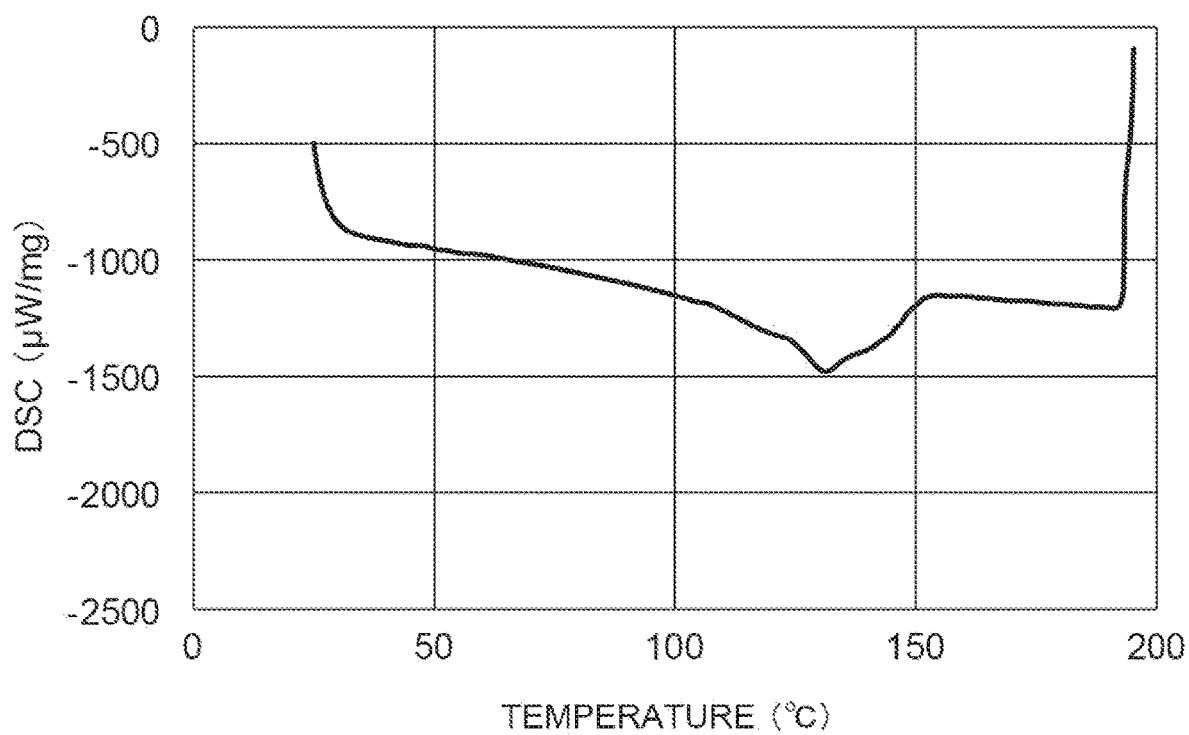
FIG. 10 is a chart showing a melting curve of a liquid-repellent layer obtained in Comparative Example 202 in a second heating process.
Figure 11:
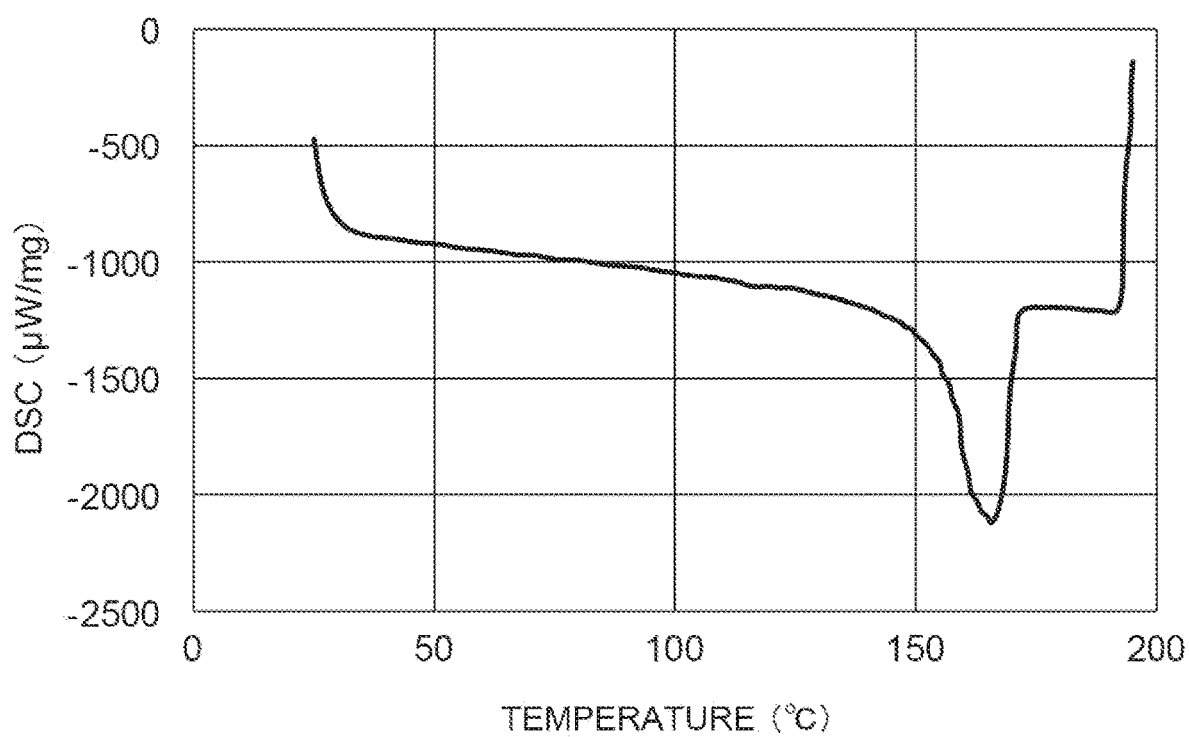
FIG. 11 is a chart showing a melting curve of a liquid-repellent layer obtained in Comparative Example 203 in a second heating process.

The liquid-repellent layer of the liquid-repellent films obtained in Examples shown in Table 5 and Table 6 was subjected to the measurement of crystallinity by X-ray diffraction. First, the X-ray diffraction spectrum was measured using an X-ray diffraction analyzer (trade name: RINT-TTR III, manufactured by Rigaku Corporation) under the following conditions. As specific examples, the X-ray diffraction spectra of the liquid-repellent layer of the liquid-repellent films obtained in Examples 101, Examples 101α, and Example 101β are shown in FIGS. 4 to 6, respectively.

<Measurement Conditions>

X-ray source: CuKα radiation
Measurement method: parallel method
Scanning mode: 2 theta
Incident angle (fixed angle)/Measurement angle: 0.5°/3 to 35°

From the resulting X-ray diffraction spectrum, the peak area of the crystal portion and the peak area of the amorphous portion were determined using an integrated software for analyzing powder X-ray diffraction patterns (trade name: JADE 7, manufactured by Rigaku Corporation) to calculate the crystallinity represented by the following equation (I). The results are shown in Table 5 and Table 6. [Equation 3]

Crystallinity (%)=((Peak area of crystal portion)/ ((Peak area of crystal portion)+(Peak area of amorphous portion)))×100     (I)

TABLE 1

| | Composition of liquid-repellent layer | | | | Component content in liquid-repellent layer | | | | | | | |
|---|---|---|---|---|---|---|---|---|---|---|---|---|
| | Mass ratio r-PP/ b-PP in component (A) | Component (B) | Component (C) | Component (D) | Component (B) [mass %] | Component (C) [mass %] | (C)/ (B) Mass ratio | Component (D) [mass %] | Second resin layer | Comparison of melting point of resin | Amount of oil swelling [mg/cm$^2$] | Liquid repellency Evaluation on residual liquid | Appearance |
| Example 1 | 20/80 | PE-Si | — | — | 5.0 | — | — | — | — | — | — | C | C |
| Example 2 | 35/65 | PE-Si | — | — | 5.0 | — | — | — | — | — | — | C | C |
| Example 3 | 50/50 | PE-Si | — | — | 5.0 | — | — | — | — | — | 0.95 | C | C |
| Example 4 | 65/35 | PE-Si | — | — | 5.0 | — | — | — | — | — | — | C | C |
| Example 5 | 80/20 | PE-Si | — | — | 5.0 | — | — | — | — | — | — | C | C |
| Example 6 | 20/80 | PE-Si | PE-Et/Bu | — | 5.0 | 0.20 | 0.04 | — | — | — | — | C | C |
| Example 7 | 35/65 | PE-Si | PE-Et/Bu | — | 5.0 | 0.20 | 0.04 | — | — | — | — | C | B |
| Example 8 | 50/50 | PE-Si | PE-Et/Bu | — | 5.0 | 0.20 | 0.04 | — | — | — | 0.95 | B | B |
| Example 9 | 65/35 | PE-Si | PE-Et/Bu | — | 5.0 | 0.20 | 0.04 | — | — | — | — | C | B |
| Example 10 | 80/20 | PE-Si | PE-Et/Bu | — | 5.0 | 0.20 | 0.04 | — | — | — | — | C | C |
| Example 11 | 20/80 | PE-Si | PE-Et/Bu | — | 0.5 | 8.00 | 16 | — | — | — | — | C | C |
| Example 12 | 35/65 | PE-Si | PE-Et/Bu | — | 0.5 | 8.00 | 16 | — | — | — | — | C | B |
| Example 13 | 50/50 | PE-Si | PE-Et/Bu | — | 0.5 | 8.00 | 16 | — | — | — | — | B | B |
| Example 14 | 65/35 | PE-Si | PE-Et/Bu | — | 0.5 | 8.00 | 16 | — | — | — | — | C | B |
| Example 15 | 80/20 | PE-Si | PE-Et/Bu | — | 0.5 | 8.00 | 16 | — | — | — | — | C | C |

TABLE 1-continued

| | Composition of liquid-repellent layer | | | | Component content in liquid-repellent layer | | | | | Comparison of melting point of resin | Amount of oil swelling [mg/cm²] | Liquid repellency | |
|---|---|---|---|---|---|---|---|---|---|---|---|---|---|
| | Mass ratio r-PP/ b-PP in component (A) | Component (B) | Component (C) | Component (D) | Component (B) [mass %] | Component (C) [mass %] | (C)/(B) Mass ratio | Component (D) [mass %] | Second resin layer | | | Evaluation on residual liquid | Appearance |
| Example 16 | 20/80 | PE-Si | PP-PE | — | 5.0 | 0.20 | 0.04 | — | — | — | — | C | B |
| Example 17 | 35/65 | PE-Si | PP-PE | — | 5.0 | 0.20 | 0.04 | — | — | — | — | B | B |
| Example 18 | 50/50 | PE-Si | PP-PE | — | 5.0 | 0.20 | 0.04 | — | — | — | 0.95 | B | A |
| Example 19 | 65/35 | PE-Si | PP-PE | — | 5.0 | 0.20 | 0.04 | — | — | — | — | B | B |
| Example 20 | 80/20 | PE-Si | PP-PE | — | 5.0 | 0.20 | 0.04 | — | — | — | — | C | B |
| Example 21 | 20/80 | PE-Si | PP-PE | — | 0.5 | 8.00 | 16 | — | — | — | — | C | B |
| Example 22 | 35/65 | PE-Si | PP-PE | — | 0.5 | 8.00 | 16 | — | — | — | — | B | B |
| Example 23 | 50/50 | PE-Si | PP-PE | — | 0.5 | 8.00 | 16 | — | — | — | — | B | A |
| Example 24 | 65/35 | PE-Si | PP-PE | — | 0.5 | 8.00 | 16 | — | — | — | — | B | B |
| Example 25 | 80/20 | PE-Si | PP-PE | — | 0.5 | 8.00 | 16 | — | — | — | — | C | B |
| Example 26 | 20/80 | PE-Si | PP-PE | — | 5.0 | 0.25 | 0.05 | — | — | — | — | B | B |
| Example 27 | 35/65 | PE-Si | PP-PE | — | 5.0 | 0.25 | 0.05 | — | — | — | — | B | A |
| Example 28 | 50/50 | PE-Si | PP-PE | — | 5.0 | 0.25 | 0.05 | — | — | — | 0.95 | A | A |
| Example 29 | 65/35 | PE-Si | PP-PE | — | 5.0 | 0.25 | 0.05 | — | — | — | — | B | A |
| Example 30 | 80/20 | PE-Si | PP-PE | — | 5.0 | 0.25 | 0.05 | — | — | — | — | B | B |
| Example 31 | 50/50 | PE-Si | PP-PE | — | 5.0 | 1.00 | 0.2 | — | — | — | 0.95 | A | A |
| Example 32 | 20/80 | PE-Si | PP-PE | — | 5.0 | 5.00 | 1 | — | — | — | — | B | B |
| Example 33 | 35/65 | PE-Si | PP-PE | — | 5.0 | 5.00 | 1 | — | — | — | — | B | A |
| Example 34 | 50/50 | PE-Si | PP-PE | — | 5.0 | 5.00 | 1 | — | — | — | 0.95 | A | A |
| Example 35 | 65/35 | PE-Si | PP-PE | — | 5.0 | 5.00 | 1 | — | — | — | — | B | A |
| Example 36 | 80/20 | PE-Si | PP-PE | — | 5.0 | 5.00 | 1 | — | — | — | — | B | B |
| Example 37 | 50/50 | PE-Si | PP-PE | — | 5.0 | 15.00 | 3 | — | — | — | — | A | A |
| Example 38 | 20/80 | PE-Si | PP-PE | — | 1.0 | 10.00 | 10 | — | — | — | — | B | B |
| Example 39 | 35/65 | PE-Si | PP-PE | — | 1.0 | 10.00 | 10 | — | — | — | — | B | A |
| Example 40 | 50/50 | PE-Si | PP-PE | — | 1.0 | 10.00 | 10 | — | — | — | 0.95 | A | A |
| Example 41 | 65/35 | PE-Si | PP-PE | — | 1.0 | 10.00 | 10 | — | — | — | — | B | A |
| Example 42 | 80/20 | PE-Si | PP-PE | — | 1.0 | 10.00 | 10 | — | — | — | — | B | B |

TABLE 2

| | Composition of liquid-repellent layer | | | | Component content in liquid-repellent layer | | | | | Comparison of melting point of resin | Amount of oil swelling [mg/cm²] | Liquid repellency | |
|---|---|---|---|---|---|---|---|---|---|---|---|---|---|
| | Mass ratio r-PP/b-PP in component (A) | Component (B) | Component (C) | Component (D) | Component (B) [mass %] | Component (C) [mass %] | (C)/(B) Mass ratio | Component (D) [mass %] | Second resin layer | | | Evaluation on residual liquid | Appearance |
| Example 43 | 50/50 | PE-Si | PP-PE | Silicone | 5.0 | 0.25 | 0.05 | 5.0 | — | — | 0.94 | A | A |
| Example 44 | 50/50 | PE-Si | PP-PE | Silicone | 5.0 | 1.00 | 0.2 | 5.0 | — | — | 0.94 | A | A |
| Example 45 | 20/80 | PE-Si | PP-PE | Silicone | 5.0 | 5.00 | 1 | 5.0 | — | — | — | B | A |
| Example 46 | 35/65 | PE-Si | PP-PE | Silicone | 5.0 | 5.00 | 1 | 5.0 | — | — | — | A | A |
| Example 47 | 50/50 | PE-Si | PP-PE | Silicone | 5.0 | 5.00 | 1 | 5.0 | — | — | 0.93 | A | A |
| Example 48 | 65/35 | PE-Si | PP-PE | Silicone | 5.0 | 5.00 | 1 | 5.0 | — | — | — | A | A |
| Example 49 | 80/20 | PE-Si | PP-PE | Silicone | 5.0 | 5.00 | 1 | 5.0 | — | — | — | B | A |
| Example 50 | 50/50 | PE-Si | PP-PE | Silicone | 5.0 | 15.00 | 3 | 5.0 | — | — | — | A | A |
| Example 51 | 50/50 | PE-Si | PP-PE | Silicone | 1.0 | 10.00 | 10 | 5.0 | — | — | 0.92 | A | A |
| Example 52 | 50/50 | PE-Si | — | — | 5.0 | — | — | — | r-PP | $T_1 > T_2$ | 0.95 | B | B |
| Example 53 | 50/50 | PE-Si | PE-Et/Bu | — | 5.0 | 0.20 | 0.04 | — | r-PP | $T_1 > T_2$ | 0.95 | B | B |
| Example 54 | 50/50 | PE-Si | PP-PE | — | 5.0 | 0.20 | 0.04 | — | r-PP | $T_1 > T_2$ | 0.95 | B | B |
| Example 55 | 50/50 | PE-Si | PP-PE | — | 5.0 | 0.25 | 0.05 | — | r-PP | $T_1 > T_2$ | 0.95 | A | A |
| Example 56 | 50/50 | PE-Si | PP-PE | — | 5.0 | 1.00 | 0.2 | — | r-PP | $T_1 > T_2$ | 0.95 | A | A |
| Example 57 | 20/80 | PE-Si | PP-PE | — | 5.0 | 5.00 | 1 | — | r-PP | $T_1 > T_2$ | — | B | B |
| Example 58 | 35/65 | PE-Si | PP-PE | — | 5.0 | 5.00 | 1 | — | r-PP | $T_1 > T_2$ | — | B | A |
| Example 59 | 50/50 | PE-Si | PP-PE | — | 5.0 | 5.00 | 1 | — | r-PP | $T_1 > T_2$ | 0.95 | A | A |
| Example 60 | 65/35 | PE-Si | PP-PE | — | 5.0 | 5.00 | 1 | — | r-PP | $T_1 > T_2$ | — | B | A |
| Example 61 | 80/20 | PE-Si | PP-PE | — | 5.0 | 5.00 | 1 | — | r-PP | $T_1 > T_2$ | — | B | B |
| Example 62 | 50/50 | PE-Si | PP-PE | — | 1.0 | 10.00 | 10 | — | r-PP | $T_1 > T_2$ | 0.95 | A | A |
| Example 63 | 50/50 | PE-Si | PP-PE | Silicone | 5.0 | 0.25 | 0.05 | 5.0 | r-PP | $T_1 > T_2$ | 0.94 | A | A |
| Example 64 | 50/50 | PE-Si | PP-PE | Silicone | 5.0 | 1.00 | 0.2 | 5.0 | r-PP | $T_1 > T_2$ | 0.94 | A | A |
| Example 65 | 20/80 | PE-Si | PP-PE | Silicone | 5.0 | 5.00 | 1 | 5.0 | r-PP | $T_1 > T_2$ | — | B | B |
| Example 66 | 35/65 | PE-Si | PP-PE | Silicone | 5.0 | 5.00 | 1 | 5.0 | r-PP | $T_1 > T_2$ | — | B | A |
| Example 67 | 50/50 | PE-Si | PP-PE | Silicone | 5.0 | 5.00 | 1 | 5.0 | r-PP | $T_1 > T_2$ | 0.93 | A | A |
| Example 68 | 65/35 | PE-Si | PP-PE | Silicone | 5.0 | 5.00 | 1 | 5.0 | r-PP | $T_1 > T_2$ | — | B | A |
| Example 69 | 80/20 | PE-Si | PP-PE | Silicone | 5.0 | 5.00 | 1 | 5.0 | r-PP | $T_1 > T_2$ | — | B | B |
| Example 70 | 50/50 | PE-Si | PP-PE | Silicone | 1.0 | 10.00 | 10 | 5.0 | r-PP | $T_1 > T_2$ | 0.92 | A | A |
| Example 71 | 20/80 | PE-Si | — | — | 5.0 | — | — | — | b-PP | $T_1 < T_2$ | — | C | C |
| Example 72 | 35/65 | PE-Si | — | — | 5.0 | — | — | — | b-PP | $T_1 < T_2$ | — | C | B |
| Example 73 | 50/50 | PE-Si | — | — | 5.0 | — | — | — | b-PP | $T_1 < T_2$ | 0.95 | B | B |
| Example 74 | 65/35 | PE-Si | — | — | 5.0 | — | — | — | b-PP | $T_1 < T_2$ | — | C | B |
| Example 75 | 80/20 | PE-Si | — | — | 5.0 | — | — | — | b-PP | $T_1 < T_2$ | — | C | C |

TABLE 2-continued

| | Composition of liquid-repellent layer | | | | Component content in liquid-repellent layer | | | | | Comparison of melting point of resin | Amount of oil swelling [mg/cm²] | Liquid repellency | |
|---|---|---|---|---|---|---|---|---|---|---|---|---|---|
| | Mass ratio r-PP/b-PP in component (A) | Component (B) | Component (C) | Component (D) | Component (B) [mass %] | Component (C) [mass %] | (C)/(B) Mass ratio | Component (D) [mass %] | Second resin layer | | | Evaluation on residual liquid | Appearance |
| Example 76 | 20/80 | PE-Si | PE-Et/Bu | — | 5.0 | 0.20 | 0.04 | — | b-PP | $T_1 < T_2$ | — | C | B |
| Example 77 | 35/65 | PE-Si | PE-Et/Bu | — | 5.0 | 0.20 | 0.04 | — | b-PP | $T_1 < T_2$ | — | B | B |
| Example 78 | 50/50 | PE-Si | PE-Et/Bu | — | 5.0 | 0.20 | 0.04 | — | b-PP | $T_1 < T_2$ | 0.95 | B | A |
| Example 79 | 65/35 | PE-Si | PE-Et/Bu | — | 5.0 | 0.20 | 0.04 | — | b-PP | $T_1 < T_2$ | — | B | B |
| Example 80 | 80/20 | PE-Si | PE-Et/Bu | — | 5.0 | 0.20 | 0.04 | — | b-PP | $T_1 < T_2$ | — | C | B |
| Example 81 | 20/80 | PE-Si | PE-Et/Bu | — | 0.5 | 8.00 | 16 | — | b-PP | $T_1 < T_2$ | — | C | B |
| Example 82 | 35/65 | PE-Si | PE-Et/Bu | — | 0.5 | 8.00 | 16 | — | b-PP | $T_1 < T_2$ | — | B | B |
| Example 83 | 50/50 | PE-Si | PE-Et/Bu | — | 0.5 | 8.00 | 16 | — | b-PP | $T_1 < T_2$ | — | B | A |
| Example 84 | 65/35 | PE-Si | PE-Et/Bu | — | 0.5 | 8.00 | 16 | — | b-PP | $T_1 < T_2$ | — | B | B |
| Example 85 | 80/20 | PE-Si | PE-Et/Bu | — | 0.5 | 8.00 | 16 | — | b-PP | $T_1 < T_2$ | — | C | B |

TABLE 3

| | Composition of liquid-repellent layer | | | | Component content in liquid-repellent layer | | | | | Comparison of melting point of resin | Amount of oil swelling [mg/cm²] | Liquid repellency | |
|---|---|---|---|---|---|---|---|---|---|---|---|---|---|
| | Mass ratio r-PP/b-PP in component (A) | Component (B) | Component (C) | Component (D) | Component (B) [mass %] | Component (C) [mass %] | (C)/(B) Mass ratio | Component (D) [mass %] | Second resin layer | | | Evaluation on residual liquid | Appearance |
| Example 86 | 20/80 | PE-Si | PP-PE | — | 5.0 | 0.20 | 0.04 | — | b-PP | $T_1 < T_2$ | — | B | B |
| Example 87 | 35/65 | PE-Si | PP-PE | — | 5.0 | 0.20 | 0.04 | — | b-PP | $T_1 < T_2$ | — | B | A |
| Example 88 | 50/50 | PE-Si | PP-PE | — | 5.0 | 0.20 | 0.04 | — | b-PP | $T_1 < T_2$ | 0.95 | A | A |
| Example 89 | 65/35 | PE-Si | PP-PE | — | 5.0 | 0.20 | 0.04 | — | b-PP | $T_1 < T_2$ | — | B | A |
| Example 90 | 80/20 | PE-Si | PP-PE | — | 5.0 | 0.20 | 0.04 | — | b-PP | $T_1 < T_2$ | — | B | B |
| Example 91 | 20/80 | PE-Si | PP-PE | — | 0.5 | 8.00 | 16 | — | b-PP | $T_1 < T_2$ | — | B | B |
| Example 92 | 35/65 | PE-Si | PP-PE | — | 0.5 | 8.00 | 16 | — | b-PP | $T_1 < T_2$ | — | B | A |
| Example 93 | 50/50 | PE-Si | PP-PE | — | 0.5 | 8.00 | 16 | — | b-PP | $T_1 < T_2$ | — | A | A |
| Example 94 | 65/35 | PE-Si | PP-PE | — | 0.5 | 8.00 | 16 | — | b-PP | $T_1 < T_2$ | — | B | A |
| Example 95 | 80/20 | PE-Si | PP-PE | — | 0.5 | 8.00 | 16 | — | b-PP | $T_1 < T_2$ | — | B | B |
| Example 96 | 20/80 | PE-Si | PP-PE | — | 5.0 | 0.25 | 0.05 | — | b-PP | $T_1 < T_2$ | — | B | A |
| Example 97 | 35/65 | PE-Si | PP-PE | — | 5.0 | 0.25 | 0.05 | — | b-PP | $T_1 < T_2$ | — | A | A |
| Example 98 | 50/50 | PE-Si | PP-PE | — | 5.0 | 0.25 | 0.05 | — | b-PP | $T_1 < T_2$ | 0.95 | A | A |
| Example 99 | 65/35 | PE-Si | PP-PE | — | 5.0 | 0.25 | 0.05 | — | b-PP | $T_1 < T_2$ | — | A | A |

TABLE 3-continued

| | Composition of liquid-repellent layer | | | | Component content in liquid-repellent layer | | | | | Comparison of melting point of resin | Amount of oil swelling [mg/cm²] | Liquid repellency | |
|---|---|---|---|---|---|---|---|---|---|---|---|---|---|
| | Mass ratio r-PP/b-PP in component (A) | Component (B) | Component (C) | Component (D) | Component (B) [mass %] | Component (C) [mass %] | (C)/(B) Mass ratio | Component (D) [mass %] | Second resin layer | | | Evaluation on residual liquid | Appearance |
| Example 100 | 80/20 | PE-Si | PP-PE | — | 5.0 | 0.25 | 0.05 | — | b-PP | $T_1 < T_2$ | — | B | A |
| Example 101 | 50/50 | PE-Si | PP-PE | — | 5.0 | 1.00 | 0.2 | — | b-PP | $T_1 < T_2$ | 0.95 | A | A |
| Example 102 | 20/80 | PE-Si | PP-PE | — | 5.0 | 5.00 | 1 | — | b-PP | $T_1 < T_2$ | 0.92 | B | A |
| Example 103 | 35/65 | PE-Si | PP-PE | — | 5.0 | 5.00 | 1 | — | b-PP | $T_1 < T_2$ | — | A | A |
| Example 104 | 50/50 | PE-Si | PP-PE | — | 5.0 | 5.00 | 1 | — | b-PP | $T_1 < T_2$ | 0.95 | A | A |
| Example 105 | 65/35 | PE-Si | PP-PE | — | 5.0 | 5.00 | 1 | — | b-PP | $T_1 < T_2$ | — | A | A |
| Example 106 | 80/20 | PE-Si | PP-PE | — | 5.0 | 5.00 | 1 | — | b-PP | $T_1 < T_2$ | 0.96 | B | A |
| Example 107 | 20/80 | PE-Si | PP-PE | — | 1.0 | 10.00 | 10 | — | b-PP | $T_1 < T_2$ | — | B | A |
| Example 108 | 35/65 | PE-Si | PP-PE | — | 1.0 | 10.00 | 10 | — | b-PP | $T_1 < T_2$ | — | A | A |
| Example 109 | 50/50 | PE-Si | PP-PE | — | 1.0 | 10.00 | 10 | — | b-PP | $T_1 < T_2$ | 0.95 | A | A |
| Example 110 | 65/35 | PE-Si | PP-PE | — | 1.0 | 10.00 | 10 | — | b-PP | $T_1 < T_2$ | — | A | A |
| Example 111 | 80/20 | PE-Si | PP-PE | — | 1.0 | 10.00 | 10 | — | b-PP | $T_1 < T_2$ | — | B | A |
| Example 112 | 50/50 | PE-Si | PP-PE | Silicone | 5.0 | 0.25 | 0.05 | 5.0 | b-PP | $T_1 < T_2$ | 0.94 | A | A |
| Example 113 | 50/50 | PE-Si | PP-PE | Silicone | 5.0 | 1.00 | 0.2 | 5.0 | b-PP | $T_1 < T_2$ | 0.94 | A | A |
| Example 114 | 20/80 | PE-Si | PP-PE | Silicone | 5.0 | 5.00 | 1 | 5.0 | b-PP | $T_1 < T_2$ | — | B | A |
| Example 115 | 35/65 | PE-Si | PP-PE | Silicone | 5.0 | 5.00 | 1 | 5.0 | b-PP | $T_1 < T_2$ | — | A | A |
| Example 116 | 50/50 | PE-Si | PP-PE | Silicone | 5.0 | 5.00 | 1 | 5.0 | b-PP | $T_1 < T_2$ | 0.93 | A | A |
| Example 117 | 65/35 | PE-Si | PP-PE | Silicone | 5.0 | 5.00 | 1 | 5.0 | b-PP | $T_1 < T_2$ | — | A | A |
| Example 118 | 80/20 | PE-Si | PP-PE | Silicone | 5.0 | 5.00 | 1 | 5.0 | b-PP | $T_1 < T_2$ | — | B | A |
| Example 119 | 50/50 | PE-Si | PP-PE | Silicone | 1.0 | 10.00 | 10 | 5.0 | b-PP | $T_1 < T_2$ | 0.92 | A | A |

TABLE 4

| | Composition of liquid-repellent layer | | | | Component content in liquid-repellent layer | | | | | Comparison of melting point of resin | Amount of oil swelling [mg/cm²] | Liquid repellency | |
|---|---|---|---|---|---|---|---|---|---|---|---|---|---|
| | Mass ratio r-PP/b-PP in component (A) | Component (B) | Component (C) | Component (D) | Component (B) [mass %] | Component (C) [mass %] | (C)/(B) Mass ratio | Component (D) [mass %] | Second resin layer | | | Evaluation on residual liquid | Appearance |
| Comparative Example 1 | 50/50 | — | — | — | — | — | — | — | — | — | — | D | D |
| Comparative Example 2 | 0/100 | PE-Si | — | — | 5.0 | — | — | — | — | — | — | D | D |
| Comparative Example 3 | 10/90 | PE-Si | — | — | 5.0 | — | — | — | — | — | — | D | D |
| Comparative Example 4 | 90/10 | PE-Si | — | — | 5.0 | — | — | — | — | — | — | D | D |

TABLE 4-continued

| | Composition of liquid-repellent layer | | | | Component content in liquid-repellent layer | | | | | Comparison of melting point of resin | Amount of oil swelling [mg/cm²] | Liquid repellency | |
|---|---|---|---|---|---|---|---|---|---|---|---|---|---|
| | Mass ratio r-PP/ b-PP in component (A) | Component (B) | Component (C) | Component (D) | Component (B) [mass %] | Component (C) [mass %] | (C)/(B) Mass ratio | Component (D) [mass %] | Second resin layer | | | Evaluation on residual liquid | Appearance |
| Comparative Example 5 | 100/0 | PE-Si | — | — | 5.0 | — | — | — | — | — | — | D | D |
| Comparative Example 6 | 50/50 | — | PE-Et/Bu | — | — | 0.20 | — | — | — | — | — | D | D |
| Comparative Example 7 | 0/100 | PE-Si | PE-Et/Bu | — | 5.0 | 0.20 | 0.04 | — | — | — | — | D | C |
| Comparative Example 8 | 10/90 | PE-Si | PE-Et/Bu | — | 5.0 | 0.20 | 0.04 | — | — | — | — | D | C |
| Comparative Example 9 | 90/10 | PE-Si | PE-Et/Bu | — | 5.0 | 0.20 | 0.04 | — | — | — | — | D | C |
| Comparative Example 10 | 100/0 | PE-Si | PE-Et/Bu | — | 5.0 | 0.20 | 0.04 | — | — | — | — | D | C |
| Comparative Example 11 | 50/50 | — | PP-PE | — | — | 0.20 | — | — | — | — | — | D | C |
| Comparative Example 12 | 0/100 | PE-Si | PP-PE | — | 5.0 | 5.00 | 1 | — | — | — | — | D | C |
| Comparative Example 13 | 10/90 | PE-Si | PP-PE | — | 5.0 | 5.00 | 1 | — | — | — | — | D | C |
| Comparative Example 14 | 90/10 | PE-Si | PP-PE | — | 5.0 | 5.00 | 1 | — | — | — | — | D | C |
| Comparative Example 15 | 100/0 | PE-Si | PP-PE | — | 5.0 | 5.00 | 1 | — | — | — | — | D | C |
| Comparative Example 16 | 0/100 | PE-Si | PP-PE | Silicone | 5.0 | 5.00 | 1 | 5.0 | — | — | — | D | C |
| Comparative Example 17 | 10/90 | PE-Si | PP-PE | Silicone | 5.0 | 5.00 | 1 | 5.0 | — | — | — | D | C |
| Comparative Example 18 | 90/10 | PE-Si | PP-PE | Silicone | 5.0 | 5.00 | 1 | 5.0 | — | — | — | D | C |
| Comparative Example 19 | 100/0 | PE-Si | PP-PE | Silicone | 5.0 | 5.00 | 1 | 5.0 | — | — | — | D | C |
| Comparative Example 20 | 90/10 | — | — | — | — | — | — | — | r-pp | $T_1 > T_2$ | 1.13 | D | C |
| Comparative Example 21 | 100/0 | — | — | — | — | — | — | — | r-pp | $T_1 = T_2$ | 1.31 | D | C |
| Comparative Example 22 | 0/100 | PE-Si | PP-PE | — | 5.0 | 5.00 | 1 | — | r-pp | $T_1 > T_2$ | — | D | C |
| Comparative Example 23 | 10/90 | PE-Si | PP-PE | — | 5.0 | 5.00 | 1 | — | r-pp | $T_1 > T_2$ | — | D | C |
| Comparative Example 24 | 90/10 | PE-Si | PP-PE | — | 5.0 | 5.00 | 1 | — | r-pp | $T_1 > T_2$ | — | D | C |
| Comparative Example 25 | 100/0 | PE-Si | PP-PE | — | 5.0 | 5.00 | 1 | — | r-pp | $T_1 = T_2$ | — | D | C |
| Comparative Example 26 | 0/100 | PE-Si | PP-PE | Silicone | 5.0 | 5.00 | 1 | 5.0 | r-pp | $T_1 > T_2$ | — | D | C |
| Comparative Example 27 | 10/90 | PE-Si | PP-PE | Silicone | 5.0 | 5.00 | 1 | 5.0 | r-pp | $T_1 > T_2$ | — | D | C |
| Comparative Example 28 | 90/10 | PE-Si | PP-PE | Silicone | 5.0 | 5.00 | 1 | 5.0 | r-pp | $T_1 > T_2$ | — | D | C |
| Comparative Example 29 | 100/0 | PE-Si | PP-PE | Silicone | 5.0 | 5.00 | 1 | 5.0 | r-pp | $T_1 = T_2$ | — | D | C |
| Comparative Example 30 | 0/100 | PE-Si | PP-PE | — | 5.0 | 5.00 | 1 | — | b-PP | $T_1 = T_2$ | — | D | C |
| Comparative Example 31 | 10/90 | PE-Si | PP-PE | — | 5.0 | 5.00 | 1 | — | b-PP | $T_1 < T_2$ | — | D | C |
| Comparative Example 32 | 90/10 | PE-Si | PP-PE | — | 5.0 | 5.00 | 1 | — | b-PP | $T_1 < T_2$ | — | D | C |
| Comparative Example 33 | 100/0 | PE-Si | PP-PE | — | 5.0 | 5.00 | 1 | — | b-PP | $T_1 < T_2$ | — | D | B |
| Comparative Example 34 | 0/100 | PE-Si | PP-PE | Silicone | 5.0 | 5.00 | 1 | 5.0 | b-PP | $T_1 = T_2$ | — | D | C |
| Comparative Example 35 | 10/90 | PE-Si | PP-PE | Silicone | 5.0 | 5.00 | 1 | 5.0 | b-PP | $T_1 < T_2$ | — | D | C |
| Comparative Example 36 | 90/10 | PE-Si | PP-PE | Silicone | 5.0 | 5.00 | 1 | 5.0 | b-PP | $T_1 < T_2$ | — | D | C |
| Comparative Example 37 | 100/0 | PE-Si | PP-PE | Silicone | 5.0 | 5.00 | 1 | 5.0 | b-PP | $T_1 < T_2$ | — | D | B |

TABLE 5

| | Composition of liquid-repellent layer | | Component content in liquid-repellent layer | | | | | Comparison of melting point of resin | Crystallinity [%] | Amount of oil swelling [mg/cm$^2$] | Liquid repellency | | |
|---|---|---|---|---|---|---|---|---|---|---|---|---|---|
| | Mass ratio r-PP/b-PP in component (A) | Component (C) | Component (B) [mass %] | Component (C) [mass %] | (C)/(B) Mass ratio | Component (D) [mass %] | Second resin layer | | | | Amount of residual liquid [%] | Evaluation on residual liquid | Appearance |
| Example 3 | 50/50 | — | 5.0 | — | — | — | — | — | 30 | 0.95 | 8.6 | C | C |
| Example 3α | 50/50 | — | 5.0 | — | — | — | — | — | 48 | 0.78 | 8.1 | C | B |
| Example 8 | 50/50 | PE-Et/Bu | 5.0 | 0.20 | 0.04 | — | — | — | 34 | 0.95 | 8.0 | B | B |
| Example 8α | 50/50 | PE-Et/Bu | 5.0 | 0.20 | 0.04 | — | — | — | 49 | 0.76 | 7.9 | B | A |
| Example 18 | 50/50 | PP-PE | 5.0 | 0.20 | 0.04 | — | — | — | 34 | 0.95 | 8.0 | B | A |
| Example 18α | 50/50 | PP-PE | 5.0 | 0.20 | 0.04 | — | — | — | 51 | 0.72 | 7.6 | B | A |
| Example 28 | 50/50 | PP-PE | 5.0 | 0.25 | 0.05 | — | — | — | 35 | 0.95 | 6.0 | A | A |
| Example 28α | 50/50 | PP-PE | 5.0 | 0.25 | 0.05 | — | — | — | 50 | 0.74 | 5.5 | A | A |
| Example 31 | 50/50 | PP-PE | 5.0 | 1.00 | 0.2 | — | — | — | 36 | 0.95 | 6.0 | A | A |
| Example 31α | 50/50 | PP-PE | 5.0 | 1.00 | 0.2 | — | — | — | 52 | 0.73 | 5.2 | A | A |
| Example 34 | 50/50 | PP-PE | 5.0 | 5.00 | 1 | — | — | — | 37 | 0.95 | 6.1 | A | A |
| Example 34α | 50/50 | PP-PE | 5.0 | 5.00 | 1 | — | — | — | 52 | 0.73 | 5.5 | A | A |
| Example 40 | 50/50 | PP-PE | 1.0 | 10.00 | 10 | — | — | — | 38 | 0.95 | 6.2 | A | A |
| Example 40α | 50/50 | PP-PE | 1.0 | 10.00 | 10 | — | — | — | 53 | 0.72 | 5.7 | A | A |
| Example 43 | 50/50 | PP-PE | 5.0 | 0.25 | 0.05 | 5.0 | — | — | 36 | 0.94 | 5.9 | A | A |
| Example 43α | 50/50 | PP-PE | 5.0 | 0.25 | 0.05 | 5.0 | — | — | 48 | 0.75 | 5.7 | A | A |
| Example 44 | 50/50 | PP-PE | 5.0 | 1.00 | 0.2 | 5.0 | — | — | 36 | 0.94 | 5.8 | A | A |
| Example 44α | 50/50 | PP-PE | 5.0 | 1.00 | 0.2 | 5.0 | — | — | 50 | 0.73 | 5.1 | A | A |
| Example 47 | 50/50 | PP-PE | 5.0 | 5.00 | 1 | 5.0 | — | — | 37 | 0.93 | 6.1 | A | A |
| Example 47α | 50/50 | PP-PE | 5.0 | 5.00 | 1 | 5.0 | — | — | 49 | 0.74 | 5.3 | A | A |
| Example 51 | 50/50 | PP-PE | 1.0 | 10.00 | 10 | 5.0 | — | — | 38 | 0.92 | 6.0 | A | A |
| Example 51α | 50/50 | PP-PE | 1.0 | 10.00 | 10 | 5.0 | — | — | 51 | 0.72 | 5.5 | A | A |
| Example 52 | 50/50 | — | 5.0 | — | — | — | r-PP | $T_1 > T_2$ | 30 | 0.95 | 8.0 | B | B |
| Example 52α | 50/50 | — | 5.0 | — | — | — | r-PP | $T_1 > T_2$ | 52 | 0.74 | 7.5 | B | A |
| Example 53 | 50/50 | PE-Et/Bu | 5.0 | 0.20 | 0.04 | — | r-PP | $T_1 > T_2$ | 34 | 0.95 | 7.8 | B | B |
| Example 53α | 50/50 | PE-Et/Bu | 5.0 | 0.20 | 0.04 | — | r-PP | $T_1 > T_2$ | 50 | 0.74 | 7.0 | B | A |
| Example 54 | 50/50 | PP-PE | 5.0 | 0.20 | 0.04 | — | r-PP | $T_1 > T_2$ | 35 | 0.95 | 7.5 | B | B |
| Example 54α | 50/50 | PP-PE | 5.0 | 0.20 | 0.04 | — | r-PP | $T_1 > T_2$ | 53 | 0.74 | 6.4 | A | A |
| Example 55 | 50/50 | PP-PE | 5.0 | 0.25 | 0.05 | — | r-PP | $T_1 > T_2$ | 35 | 0.93 | 5.5 | A | A |
| Example 55α | 50/50 | PP-PE | 5.0 | 0.25 | 0.05 | — | r-PP | $T_1 > T_2$ | 50 | 0.74 | 5.3 | A | A |
| Example 56 | 50/50 | PP-PE | 5.0 | 1.00 | 0.2 | — | r-PP | $T_1 > T_2$ | 36 | 0.95 | 5.6 | A | A |
| Example 56α | 50/50 | PP-PE | 5.0 | 1.00 | 0.2 | — | r-PP | $T_1 > T_2$ | 53 | 0.73 | 3.6 | A | A |

TABLE 5-continued

| | Composition of liquid-repellent layer | | Component content in liquid-repellent layer | | | | | Compar-ison of melting point of resin | Crystal-linity [%] | A-mount of oil swell-ing [mg/cm$^2$] | Liquid repellency | | |
|---|---|---|---|---|---|---|---|---|---|---|---|---|---|
| | Mass ratio r-PP/b-PP in compo-nent (A) | Com-ponent (C) | Com-ponent (B) [mass %] | Com-ponent (C) [mass %] | (C)/(B) Mass ratio | Com-ponent (D) [mass %] | Second resin layer | | | | A-mount of residual liquid [%] | Eval-uation on residual liquid | Appear-ance |
| Example 59 | 50/50 | PP-PE | 5.0 | 5.00 | 1 | — | r-PP | $T_1 > T_2$ | 37 | 0.95 | 5.9 | A | A |
| Example 59α | 50/50 | PP-PE | 5.0 | 5.00 | 1 | — | r-PP | $T_1 > T_2$ | 55 | 0.72 | 5.4 | A | A |
| Example 62 | 50/50 | PP-PE | 1.0 | 10.00 | 10 | — | r-PP | $T_1 > T_2$ | 37 | 0.95 | 6.0 | A | A |
| Example 62α | 50/50 | PP-PE | 1.0 | 10.00 | 10 | — | r-PP | $T_1 > T_2$ | 51 | 0.73 | 5.5 | A | A |

TABLE 6

| | Composition of liquid-repellent layer | | Component content in liquid-repellent layer | | | | | Compar-ison of melting point of resin | Crystal-linity [%] | A-mount of oil swell-ing [mg/cm$^2$] | Liquid repellency | | |
|---|---|---|---|---|---|---|---|---|---|---|---|---|---|
| | Mass ratio r-PP/b-PP in compo-nent (A) | Com-ponent (C) | Com-ponent (B) [mass %] | Com-ponent (C) [mass %] | (C)/(B) Mass ratio | Com-ponent (D) [mass %] | Second resin layer | | | | A-mount of residual liquid [%] | Eval-uation on residual liquid | Appear-ance |
| Example 63 | 50/50 | PP-PE | 5.0 | 0.25 | 0.05 | 5.0 | r-PP | $T_1 > T_2$ | 36 | 0.94 | 5.4 | A | A |
| Example 63α | 50/50 | PP-PE | 5.0 | 0.25 | 0.05 | 5.0 | r-PP | $T_1 > T_2$ | 49 | 0.74 | 5.2 | A | A |
| Example 64 | 50/50 | PP-PE | 5.0 | 1.00 | 0.2 | 5.0 | r-PP | $T_1 > T_2$ | 36 | 0.94 | 5.4 | A | A |
| Example 64α | 50/50 | PP-PE | 5.0 | 1.00 | 0.2 | 5.0 | r-PP | $T_1 > T_2$ | 51 | 0.73 | 3.5 | A | A |
| Example 67 | 50/50 | PP-PE | 5.0 | 5.00 | 1 | 5.0 | r-PP | $T_1 > T_2$ | 37 | 0.93 | 5.7 | A | A |
| Example 67α | 50/50 | PP-PE | 5.0 | 5.00 | 1 | 5.0 | r-PP | $T_1 > T_2$ | 53 | 0.72 | 5.2 | A | A |
| Example 70 | 50/50 | PP-PE | 1.0 | 10.00 | 10 | 5.0 | r-PP | $T_1 > T_2$ | 37 | 0.92 | 5.9 | A | A |
| Example 70α | 50/50 | PP-PE | 1.0 | 10.00 | 10 | 5.0 | r-PP | $T_1 > T_2$ | 52 | 0.72 | 5.5 | A | A |
| Example 73 | 50/50 | — | 5.0 | — | — | — | b-PP | $T_1 < T_2$ | 31 | 0.95 | 7.9 | B | B |
| Example 73α | 50/50 | — | 5.0 | — | — | — | b-PP | $T_1 < T_2$ | 46 | 0.74 | 7.2 | B | A |
| Example 78 | 50/50 | PE-Et/Bu | 5.0 | 0.20 | 0.04 | — | b-PP | $T_1 < T_2$ | 34 | 0.95 | 7.5 | B | A |
| Example 78α | 50/50 | PE-Et/Bu | 5.0 | 0.20 | 0.04 | — | b-PP | $T_1 < T_2$ | 47 | 0.74 | 6.7 | B | A |
| Example 88 | 50/50 | PP-PE | 5.0 | 0.20 | 0.04 | — | b-PP | $T_1 < T_2$ | 35 | 0.95 | 6.5 | A | A |
| Example 88α | 50/50 | PP-PE | 5.0 | 0.20 | 0.04 | — | b-PP | $T_1 < T_2$ | 51 | 0.73 | 6.1 | A | A |
| Example 98 | 50/50 | PP-PE | 5.0 | 0.25 | 0.05 | — | b-PP | $T_1 < T_2$ | 35 | 0.95 | 5.3 | A | A |
| Example 98α | 50/50 | PP-PE | 5.0 | 0.25 | 0.05 | — | b-PP | $T_1 < T_2$ | 52 | 0.74 | 4.8 | A | A |
| Example 101 | 50/50 | PP-PE | 5.0 | 1.00 | 0.2 | — | b-PP | $T_1 < T_2$ | 36 | 0.95 | 5.4 | A | A |
| Example 101α | 50/50 | PP-PE | 5.0 | 1.00 | 0.2 | — | b-PP | $T_1 < T_2$ | 53 | 0.74 | 3.5 | A | A |

TABLE 6-continued

| | Composition of liquid-repellent layer | | Component content in liquid-repellent layer | | | | | | | A-mount of oil swelling [mg/cm²] | Liquid repellency | | |
|---|---|---|---|---|---|---|---|---|---|---|---|---|---|
| | Mass ratio r-PP/b-PP in component (A) | Component (C) | Component (B) [mass %] | Component (C) [mass %] | (C)/(B) Mass ratio | Component (D) [mass %] | Second resin layer | Comparison of melting point of resin | Crystallinity [%] | | A-mount of residual liquid [%] | Evaluation on residual liquid | Appearance |
| Example 101β | 50/50 | PP-PE | 5.0 | 1.00 | 0.2 | — | b-PP | $T_1 < T_2$ | 63 | 0.60 | 5.6 | A | A |
| Example 102 | 20/80 | PP-PE | 5.0 | 5.00 | 1 | — | b-PP | $T_1 < T_2$ | 39 | 0.92 | 6.7 | B | A |
| Example 102α | 20/80 | PP-PE | 5.0 | 5.00 | 1 | — | b-PP | $T_1 < T_2$ | 53 | 0.71 | 5.4 | A | A |
| Example 104 | 50/50 | PP-PE | 5.0 | 5.00 | 1 | — | b-PP | $T_1 < T_2$ | 37 | 0.95 | 5.6 | A | A |
| Example 104α | 50/50 | PP-PE | 5.0 | 5.00 | 1 | — | b-PP | $T_1 < T_2$ | 51 | 0.74 | 5.1 | A | A |
| Example 106 | 80/20 | PP-PE | 5.0 | 5.00 | 1 | — | b-PP | $T_1 < T_2$ | 35 | 0.96 | 6.8 | B | A |
| Example 106α | 80/20 | PP-PE | 5.0 | 5.00 | 1 | — | b-PP | $T_1 < T_2$ | 52 | 0.75 | 5.6 | A | A |
| Example 109 | 50/50 | PP-PE | 1.0 | 10.00 | 10 | — | b-PP | $T_1 < T_2$ | 37 | 0.95 | 5.9 | A | A |
| Example 109α | 50/50 | PP-PE | 1.0 | 10.00 | 10 | — | b-PP | $T_1 < T_2$ | 51 | 0.73 | 5.3 | A | A |
| Example 112 | 50/50 | PP-PE | 5.0 | 0.25 | 0.05 | 5.0 | b-PP | $T_1 < T_2$ | 36 | 0.94 | 5.1 | A | A |
| Example 112α | 50/50 | PP-PE | 5.0 | 0.25 | 0.05 | 5.0 | b-PP | $T_1 < T_2$ | 54 | 0.72 | 4.7 | A | A |
| Example 113 | 50/50 | PP-PE | 5.0 | 1.00 | 0.2 | 5.0 | b-PP | $T_1 < T_2$ | 36 | 0.94 | 5.2 | A | A |
| Example 113α | 50/50 | PP-PE | 5.0 | 1.00 | 0.2 | 5.0 | b-PP | $T_1 < T_2$ | 49 | 0.73 | 3.2 | A | A |
| Example 116 | 50/50 | PP-PE | 5.0 | 5.00 | 1 | 5.0 | b-PP | $T_1 < T_2$ | 37 | 0.93 | 5.5 | A | A |
| Example 116α | 50/50 | PP-PE | 5.0 | 5.00 | 1 | 5.0 | b-PP | $T_1 < T_2$ | 52 | 0.71 | 4.8 | A | A |
| Example 119 | 50/50 | PP-PE | 1.0 | 10.00 | 10 | 5.0 | b-PP | $T_1 < T_2$ | 38 | 0.92 | 5.8 | A | A |
| Example 119α | 50/50 | PP-PE | 1.0 | 10.00 | 10 | 5.0 | b-PP | $T_1 < T_2$ | 51 | 0.72 | 5.1 | A | A |

As clearly shown in the results described in Tables 1 to 4, it has been confirmed that according to the liquid-repellent laminates in Examples 1 to 119, the liquid repellency can be more improved in comparison with the liquid-repellent laminates in Comparative Examples 1 to 37. Also, as clearly shown in the results described in Table 5 and Table 6, it has been confirmed that with a crystallinity of the liquid-repellent layer controlled in the range of 45 to 55%, the liquid repellency can be further improved.

Example 201

<Preparation of Liquid-Repellent Layer Forming Resin Composition>

A random polypropylene resin (A1) (propylene-ethylene random copolymer, trade name "Prime Polypro", manufactured by Prime Polymer Co., Ltd., melting point: 134° C. (catalog value), hereinafter abbreviated as "r-PP" in some cases) and a block polypropylene resin (A2) (propylene-ethylene block copolymer, trade name "Novatec", manufactured by Japan Polypropylene Corporation, melting point: 165 to 166° C. (catalog value), hereinafter abbreviated as "b-PP" in some cases) as the component (A) and a sylilated polyethylene (a block copolymer of PE-Si, manufactured by Dow Corning Toray Co., Ltd., hereinafter abbreviated as "PE-Si" in some cases) as the component (B) were mixed to prepare a liquid-repellent layer forming resin composition. The content of each of the components was adjusted to a mass ratio between r-PP and b-PP in the component (A) (Mass of r-PP/Mass of b-PP) of 20/80 and 5 mass % of the component (B) with a balance of the component (A) based on the total amount of the component (A) and the component (B).

<Preparation of Liquid-Repellent Laminate>

Using a three-layer coextrusion machine, a liquid-repellent layer forming resin composition was extruded to form a liquid-repellent film consisting of a liquid-repellent layer having a thickness of 60 μm. The resulting liquid-repellent film and a PET film (trade name "Emblet", manufactured by Unitika Ltd.) having a thickness of 38 μm as base material were dry laminated using a polyurethane adhesive (manufactured by Mitsui Chemicals, Inc.), and aged at 50° C. for 5 days to obtain a liquid-repellent laminate.

Examples 202 to 203

A liquid-repellent layer forming resin composition, a liquid-repellent film and a liquid-repellent laminate were prepared in the same manner as in Example 201, except that the mass ratio between r-PP and b-PP in the component (A) in the liquid-repellent layer forming resin composition was changed as shown in Table 7.

Example 204

A liquid-repellent layer forming resin composition, a liquid-repellent film, and a liquid-repellent laminate were prepared in the same manner as in Example 202, except that a silicone oil (dimethyl silicone manufactured by Dow Corning Toray Co., Ltd., hereinafter also abbreviated as "silicone" in some cases) as the component (D) was further added to the liquid-repellent layer forming resin composition to adjust the content of each of the components. In the liquid-repellent layer forming resin composition, the contents of the component (B) and the component (D) based on the total amount of the component (A), the component (B), and the component (D) were adjusted to their respective values indicated in Table 7.

Examples 205 to 216 and 218 to 220

A liquid-repellent layer forming resin composition, a liquid-repellent film, and a liquid-repellent laminate were prepared in the same manner as in Example 201, except that a block copolymer of ethylene and an ethylene-butylene copolymer (hereinafter abbreviated as "PE-Et/Bu" in some cases) or a block copolymer of propylene and ethylene (hereinafter abbreviated as "PP-PE" in some cases) as component (C) was further added to the liquid-repellent layer forming resin composition to adjust the content of each of the components. In the liquid-repellent layer forming resin composition, the mass ratio between r-PP and b-PP in the component (A), the type of the component (C), and the contents of the component (B) and the component (C) based on the total amount of the component (A), the component (B) and the component (C) were adjusted to their respective values indicated in Table 7.

Examples 217

A liquid-repellent layer forming resin composition, a liquid-repellent film, and a liquid-repellent laminate were prepared in the same manner as in Example 202, except that a block copolymer of propylene and ethylene ("PP-PE") as component (C) and a silicone oil (silicone) as component (D) were further added to the liquid-repellent layer forming resin composition to adjust the content of each of the components. In the liquid-repellent layer forming resin composition, the contents of the component (B), the component (C), and the component (D) based on the total amount of the component (A), the component (B), the component (C) and the component (D) were adjusted to their respective values indicated in Table 7.

Example 221

<Preparation of Liquid-Repellent Layer Forming Resin Composition>
A liquid-repellent layer forming resin composition was prepared in the same manner as in Example 201, except that a block copolymer of propylene and ethylene (PP-PE) as component (C) was further added to the liquid-repellent layer forming resin composition to adjust the content of each of the components. In the liquid-repellent layer forming resin composition, the contents of the component (B) and the component (C) based on the total amount of the component (A), the component (B) and the component (C) were adjusted to their respective values indicated in Table 8.

<Preparation of Liquid-Repellent Laminate>
A random polypropylene resin (A1) (r-PP) as component (A) was used as the second resin layer forming resin composition. Using a three-layer coextrusion machine, a liquid-repellent layer forming resin composition and the second resin layer forming resin composition were extruded to form a liquid-repellent film consisting of a liquid-repellent layer having a thickness of 15 µm and a second resin layer having a thickness of 45 µm. The second resin layer of the resulting liquid-repellent film and a PET film (trade name "Emblet", manufactured by Unitika Ltd.) having a thickness of 38 µm as base material were dry laminated using a polyurethane adhesive (manufactured by Mitsui Chemicals, Inc.) to obtain a liquid-repellent laminate.

Examples 222 to 230

A liquid-repellent layer forming resin composition, a second resin layer forming resin composition, a liquid-repellent film and a liquid-repellent laminate were prepared in the same manner as in Example 221, except that the mass ratio between r-PP and b-PP in the component (A) in the liquid-repellent layer forming resin composition, and the contents of the component (B) and the component (C) were adjusted to the values as indicated in Table 8.

Example 231

A liquid-repellent layer forming resin composition, a second resin layer forming resin composition, a liquid-repellent film, and a liquid-repellent laminate were prepared in the same manner as in Example 225, except that a block copolymer of ethylene and an ethylene-butylene copolymer (PE-Et/Bu) was used as component (C) in the liquid-repellent layer forming resin composition, and a block polypropylene resin (b-PP) (A2) that is a component (A) was used as the second resin layer forming resin composition.

Example 232

A liquid-repellent layer forming resin composition, a second resin layer forming resin composition, a liquid-repellent film and a liquid-repellent laminate were prepared in the same manner as in Example 221, except that a block polypropylene resin (b-PP) (A2) that is a component (A) was used as the second resin layer forming resin composition.

Examples 233 to 241

A liquid-repellent layer forming resin composition, a second resin layer forming resin composition, a liquid-repellent film and a liquid-repellent laminate were prepared in the same manner as in Example 232, except that the mass ratio between r-PP and b-PP in the component (A) in the liquid-repellent layer forming resin composition, and the contents of the component (B) and the component (C) were adjusted to the values as indicated in Table 8.

Comparative Example 201

A liquid-repellent layer forming resin composition, a second resin layer forming resin composition, a liquid-repellent film and a liquid-repellent laminate were prepared in the same manner as in Example 224, except that the component (B) and the component (C) were not added to the liquid-repellent layer forming resin composition.

Comparative Example 202

A liquid-repellent layer forming resin composition, a second resin layer forming resin composition, a liquid-repellent film and a liquid-repellent laminate were prepared in the same manner as in Example 221, except that r-PP was used alone as the component (A) in the liquid-repellent layer forming resin composition, and the component (C) was not added to the liquid-repellent layer forming resin composition.

Comparative Example 203

A liquid-repellent layer forming resin composition, a second resin layer forming resin composition, a liquid-repellent film and a liquid-repellent laminate were prepared in the same manner as in Example 221, except that b-PP was used alone as the component (A) in the liquid-repellent layer forming resin composition, and the component (C) was not added to the liquid-repellent layer forming resin composition.

In Table 7 and Table 8, the mass ratio of the content of the component (C) to the content of the component (B), (Mass of component (C)/Mass of component (B)), in the liquid-repellent layer is shown. Also, in Table 7 and Table 8, the magnitude relationship between the melting point $T_1$ (° C.) of the resin as the component (A) measured in the liquid-repellent layer and the melting point $T_2$ (° C.) of the resin as the component (A) used in the second resin layer is shown. In the case where the liquid-repellent layer contains r-PP and b-PP as the component (A), $T_1$ representing the melting point of r-PP that melts at low temperature in the liquid-repellent layer is affected by b-PP, being different from the measured melting point of the single r-PP. The melting point $T_1$ of the component (A) in the liquid-repellent layer and the melting point $T_2$ of the resin in the second resin layer were measured by a thermal analyzer (TA7000 manufactured by Hitachi High-Tech Science Corporation).

[Differential Scanning Calorimetry (DSC)]

Using the liquid-repellent layer of the liquid-repellent films prepared in Examples and Comparative Examples as a measurement specimen, the differential scanning calorimetry (DSC) was performed in accordance with JIS K7121-1987. As the measurement apparatus, DSC 6220 and SII EXTAR 6000 manufactured by Hitachi High-Tech Science Corporation (formerly SII Nano Technology Inc.) were used. The measurement conditions were conditions where the following steps (1) to (5) were carried out sequentially:

(1) heating to 200° C. at a heating rate of 10° C./min, as a first heating process;
(2) retaining at 200° C. for 5 minutes;
(3) cooling to 0° C. at a cooling rate of 100° C./min;
(4) retaining at 0° C. for 5 minutes; and
(5) heating to 200° C. at a heating rate of 10° C./min, as a second heating process.

From the melting curve in the second heating process obtained in the above measurement, the number of endothermic peaks in the range of 130 to 170° C. and the peak temperatures were obtained. The results are shown in Table 7 and Table 8. Also, the melting curves of the liquid-repellent layer in Examples 201 to 203 and Comparative Examples 202 to 203 in the second heating process are shown in FIG. 7 to FIG. 11, respectively.

[Evaluation on Liquid Repellency]
<Evaluation of Residual Liquid after Retort Treatment>

The liquid-repellent laminates obtained in Examples and Comparative Examples were subjected to evaluation on liquid repellency after retort treatment by the method shown in FIG. 3. First, two sheets of samples 100 were prepared by cutting the liquid-repellent laminate into a length of 150 mm and a width of 138 mm. The two sheets of the samples 100 were superimposed such that each of the liquid-repellent layers was located inside. One edge side in the longitudinal direction and both two edge sides in the width direction were heat sealed over a width of 10 mm with a heat sealer under conditions of 190° C., 0.03 MPa, and 2 seconds to form a seal part 51, so that a pouch with an edge side in the longitudinal direction open was prepared (refer to FIG. 3(a)). Subsequently, 180 g of an oil dispersed in water-type liquid 54 (trade name: "Bon Curry Gold, medium spicy", manufactured by Otsuka Foods Co., Ltd., amount of fat: 7.0 g in 180 g) was poured through the opening of the pouch (refer to FIG. 3(b)). The opening was then heat sealed over a width of 10 mm with a heat sealer under conditions at 190° C. under 0.03 MPa for 2 seconds to form a seal part 51, so that the pouch was hermetically sealed (refer to FIG. 3(c)).

The hermetically sealed pouch placed in a high-temperature high-pressure cooking sterilizer (manufactured by Hitachi Capital Corporation) was subjected to retort treatment with a high-temperature steam under a condition of a pressure of 0.2 MPa, at 121° C. for 30 minutes, and further subjected to warming in hot water at 100° C. for 5 minutes. Immediately after the above treatment, the upper part of the hermetically sealed pouch was cut to form a spout (refer to FIG. 3(d)). Subsequently, the pouch was turned upside down and held for 10 seconds with the spout inclined at 45° from the horizontal plane to discharge the oil dispersed in water-type liquid 54 into a container 56, and the amount discharged (g) was weighed with a scale 57 (refer to FIG. 3(e)). From the measured amount discharged, the amount of residual liquid (%) was obtained by the following equation.

Amount of residual liquid (%)={(180−Amount discharged)/180}×100

The measurement was performed 3 times, and the residual liquid was evaluated from the average amount of residual liquid of the 3 measurements based on the following evaluation criteria. The evaluation results are shown in Table 7 and Table 8.

A: The average amount of residual liquid is less than 6.5%.
B: The average amount of residual liquid is 6.5% or more and less than 8.0%.
C: The average amount of residual liquid is 8.0% or more and less than 10.0%.
D: The average amount of residual liquid is 10.0% or more.

<Evaluation on Appearance after Retort Treatment>

In the above evaluation on the liquid repellency, when the liquid was discharged from inside the pouch, the discharge behavior of the liquid was visually observed to perform evaluation on appearance based on the following evaluation criteria. The results are shown in Table 7 and Table 8.

A: A state of clearly repelling liquid is observed, and adhesion to the liquid-repellent laminate is extremely scarce.
B: A state of repelling liquid is observed, and adhesion to the liquid-repellent laminate is scarce.
C: Although a state of repelling liquid is observed, adhesion to the liquid-repellent laminate is present.
D: A state of repelling liquid is not observed.

TABLE 7

| | Liquid-repellent layer | | | | | | Component content in liquid-repellent layer |
|---|---|---|---|---|---|---|---|
| | Component (A) | | | | | | |
| | Number of endothermic peaks in second heating process and peak temperature (130-170° C.) | | | | | | |
| | r-PP/b-PP Mass ratio | 130° C. or more and less than 150° C. | 150° C. or more and 170° C. or less | Total | Component (B) | Component (C) | Component (D) | Component (B) [mass %] |
|---|---|---|---|---|---|---|---|---|
| Example 201 | 20/80 | 1 (145.7° C.) | 2 (153.2° C., 166.2° C.) | 3 | PE-Si | — | — | 5.0 |
| Example 202 | 50/50 | 1 (145.7° C.) | 2 (153.5° C., 166.5° C.) | 3 | PE-Si | — | — | 5.0 |
| Example 203 | 80/20 | 1 (145.6° C.) | 2 (153.0° C., 166.9° C.) | 3 | PE-Si | — | — | 5.0 |
| Example 204 | 50/50 | 1 (145.7° C.) | 2 (153.5° C., 166.5° C.) | 3 | PE-Si | — | Silicone | 5.0 |
| Example 205 | 50/50 | 1 (145.7° C.) | 2 (153.5° C., 166.5° C.) | 3 | PE-Si | PE-Et/Bu | — | 5.0 |
| Example 206 | 50/50 | 1 (145.7° C.) | 2 (153.5° C., 166.5° C.) | 3 | PE-Si | PP-PE | — | 5.0 |
| Example 207 | 50/50 | 1 (145.7° C.) | 2 (153.5° C., 166.5° C.) | 3 | PE-Si | PP-PE | — | 1.0 |
| Example 208 | 50/50 | 1 (145.7° C.) | 2 (153.5° C., 166.5° C.) | 3 | PE-Si | PE-Et/Bu | — | 5.0 |
| Example 209 | 20/80 | 1 (145.7° C.) | 2 (153.2° C., 166.2° C.) | 3 | PE-Si | PP-PE | — | 5.0 |
| Example 210 | 20/80 | 1 (145.7° C.) | 2 (153.2° C., 166.2° C.) | 3 | PE-Si | PP-PE | — | 5.0 |
| Example 211 | 20/80 | 1 (145.7° C.) | 2 (153.2° C., 166.2° C.) | 3 | PE-Si | PP-PE | — | 1.0 |
| Example 212 | 50/50 | 1 (145.7° C.) | 2 (153.5° C., 166.5° C.) | 3 | PE-Si | PP-PE | — | 5.0 |
| Example 213 | 50/50 | 1 (145.7° C.) | 2 (153.5° C., 166.5° C.) | 3 | PE-Si | PP-PE | — | 5.0 |
| Example 214 | 50/50 | 1 (145.7° C.) | 2 (153.5° C., 166.5° C.) | 3 | PE-Si | PP-PE | — | 5.0 |
| Example 215 | 50/50 | 1 (145.7° C.) | 2 (153.5° C., 166.5° C.) | 3 | PE-Si | PP-PE | — | 1.0 |
| Example 216 | 50/50 | 1 (145.7° C.) | 2 (153.5° C., 166.5° C.) | 3 | PE-Si | PP-PE | — | 1.0 |
| Example 217 | 50/50 | 1 (145.7° C.) | 2 (153.5° C., 166.5° C.) | 3 | PE-Si | PP-PE | Silicone | 5.0 |
| Example 218 | 80/20 | 1 (145.6° C.) | 2 (153.0° C., 166.9° C.) | 3 | PE-Si | PP-PE | — | 5.0 |
| Example 219 | 80/20 | 1 (145.6° C.) | 2 (153.0° C., 166.9° C.) | 3 | PE-Si | PP-PE | — | 5.0 |
| Example 220 | 80/20 | 1 (145.6° C.) | 2 (153.0° C., 166.9° C.) | 3 | PE-Si | PP-PE | — | 1.0 |

| | Component content in liquid-repellent layer | | | | | Liquid repellency | | |
|---|---|---|---|---|---|---|---|---|
| | Component (C) [mass %] | (C)/(B) Mass ratio | Component (D) [mass %] | Second resin layer | Comparison of melting point of resin | Amount of residual liquid [%] | Evaluation on residual liquid | Appearance |
| Example 201 | — | — | — | — | — | 9.0 | C | C |
| Example 202 | — | — | — | — | — | 8.6 | C | C |
| Example 203 | — | — | — | — | — | 9.1 | C | C |
| Example 204 | — | — | 5.0 | — | — | 8.3 | C | B |
| Example 205 | 0.20 | 0.04 | — | — | — | 8.5 | C | B |
| Example 206 | 0.20 | 0.04 | — | — | — | 8.0 | C | B |
| Example 207 | 25.00 | 25 | — | — | — | 8.2 | C | B |
| Example 208 | 0.25 | 0.05 | — | — | — | 7.6 | B | B |
| Example 209 | 0.25 | 0.05 | — | — | — | 7.1 | B | B |
| Example 210 | 15.00 | 3 | — | — | — | 7.2 | B | B |
| Example 211 | 10.00 | 10 | — | — | — | 7.8 | B | B |
| Example 212 | 0.25 | 0.05 | — | — | — | 6.0 | A | A |
| Example 213 | 1.00 | 0.2 | — | — | — | 6.0 | A | A |
| Example 214 | 5.00 | 1 | — | — | — | 6.1 | A | A |
| Example 215 | 10.00 | 10 | — | — | — | 6.2 | A | A |
| Example 216 | 20.00 | 20 | — | — | — | 6.4 | A | A |
| Example 217 | 1.00 | 0.2 | 5.0 | — | — | 5.8 | A | A |
| Example 218 | 0.25 | 0.05 | — | — | — | 7.3 | B | B |
| Example 219 | 15.00 | 3 | — | — | — | 7.4 | B | B |
| Example 220 | 10.00 | 10 | — | — | — | 7.6 | B | B |

TABLE 8

| | Liquid-repellent layer | | | | | | Component content in liquid-repellent layer |
|---|---|---|---|---|---|---|---|
| | Component (A) | | | | | | |
| | Number of endothermic peaks in second heating process and peak temperature (130-170° C.) | | | | | | |
| | r-PP/b-PP Mass ratio | 130° C. or more and less than 150° C. | 150° C. or more and 170° C. or less | Total | Component (B) | Component (C) | Component (D) | Component (B) [mass %] |
| Example 221 | 20/80 | 1 (145.7° C.) | 2 (153.2° C., 166.2° C.) | 3 | PE-Si | PP-PE | — | 5.0 |
| Example 222 | 20/80 | 1 (145.7° C.) | 2 (153.2° C., 166.2° C.) | 3 | PE-Si | PP-PE | — | 5.0 |

TABLE 8-continued

| | | | | | | | | |
|---|---|---|---|---|---|---|---|---|
| Example 223 | 20/80 | 1 (145.7° C.) | 2 (153.2° C., 166.2° C.)3 | | PE-Si | PP-PE | — | 1.0 |
| Example 224 | 50/50 | 1 (145.7° C.) | 2 (153.5° C., 166.5° C.)3 | | PE-Si | PP-PE | — | 5.0 |
| Example 225 | 50/50 | 1 (145.7° C.) | 2 (153.5° C., 166.5° C.)3 | | PE-Si | PP-PE | — | 5.0 |
| Example 226 | 50/50 | 1 (145.7° C.) | 2 (153.5° C., 166.5° C.)3 | | PE-Si | PP-PE | — | 5.0 |
| Example 227 | 50/50 | 1 (145.7° C.) | 2 (153.5° C., 166.5° C.)3 | | PE-Si | PP-PE | — | 1.0 |
| Example 228 | 80/20 | 1 (145.6° C.) | 2 (153.0° C., 166.9° C.)3 | | PE-Si | PP-PE | — | 5.0 |
| Example 229 | 80/20 | 1 (145.6° C.) | 2 (153.0° C., 166.9° C.)3 | | PE-Si | PP-PE | — | 10.0 |
| Example 230 | 80/20 | 1 (145.6° C.) | 2 (153.0° C., 166.9° C.)3 | | PE-Si | PP-PE | — | 1.0 |
| Example 231 | 50/50 | 1 (145.7° C.) | 2 (153.5° C., 166.5° C.)3 | | PE-Si | PE-Et/Bu | — | 5.0 |
| Example 232 | 20/80 | 1 (145.7° C.) | 2 (153.2° C., 166.2° C.)3 | | PE-Si | PP-PE | — | 5.0 |
| Example 233 | 20/80 | 1 (145.7° C.) | 2 (153.2° C., 166.2° C.)3 | | PE-Si | PP-PE | — | 5.0 |
| Example 234 | 20/80 | 1 (145.7° C.) | 2 (153.2° C., 166.2° C.)3 | | PE-Si | PP-PE | — | 1.0 |
| Example 235 | 50/50 | 1 (145.7° C.) | 2 (153.5° C., 166.5° C.)3 | | PE-Si | PP-PE | — | 5.0 |
| Example 236 | 50/50 | 1 (145.7° C.) | 2 (153.5° C., 166.5° C.)3 | | PE-Si | PP-PE | — | 5.0 |
| Example 237 | 50/50 | 1 (145.7° C.) | 2 (153.5° C., 166.5° C.)3 | | PE-Si | PP-PE | — | 5.0 |
| Example 238 | 50/50 | 1 (145.7° C.) | 2 (153.5° C., 166.5° C.)3 | | PE-Si | PP-PE | — | 1.0 |
| Example 239 | 80/20 | 1 (145.6° C.) | 2 (153.0° C., 166.9° C.)3 | | PE-Si | PP-PE | — | 5.0 |
| Example 240 | 80/20 | 1 (145.6° C.) | 2 (153.0° C., 166.9° C.)3 | | PE-Si | PP-PE | — | 5.0 |
| Example 241 | 80/20 | 1 (145.6° C.) | 2 (153.0° C., 166.9° C.)3 | | PE-Si | PP-PE | — | 1.0 |
| Comparative Example 201 | 50/50 | 1 (145.7° C.) | 2 (153.5° C., 166.5° C.)3 | | — | — | — | — |
| Comparative Example 202 | 100/0 | 1 (131.4° C.) | 0 | | PE-Si | — | — | 5.0 |
| Comparative Example 203 | 0/100 | 0 | 1 (166.1° C.) | 1 | PE-Si | — | — | 5.0 |

| | Component content in liquid-repellent layer | | | Second resin layer | Comparison of melting point of resin | Liquid repellency | | |
|---|---|---|---|---|---|---|---|---|
| | Component (C) [mass %] | (C)/(B) Mass ratio | Component (D) [mass %] | | | Amount of residual liquid [%] | Evaluation on residual liquid | Appearance |
| Example 221 | 1.00 | 0.2 | — | r-PP | $T_1 > T_2$ | 7.0 | B | B |
| Example 222 | 15.00 | 3 | — | r-PP | $T_1 > T_2$ | 7.0 | B | B |
| Example 223 | 10.00 | 10 | — | r-PP | $T_1 > T_2$ | 7.3 | B | B |
| Example 224 | 0.25 | 0.05 | — | r-PP | $T_1 > T_2$ | 5.5 | A | A |
| Example 225 | 1.00 | 0.2 | — | r-PP | $T_1 > T_2$ | 5.6 | A | A |
| Example 226 | 5.00 | 1 | — | r-PP | $T_1 > T_2$ | 5.9 | A | A |
| Example 227 | 10.00 | 10 | — | r-PP | $T_1 > T_2$ | 6.0 | A | A |
| Example 228 | 0.25 | 0.05 | — | r-PP | $T_1 > T_2$ | 6.9 | B | B |
| Example 229 | 10.00 | 1 1 | — | r-PP | $T_1 > T_2$ | 7.1 | B | B |
| Example 230 | 10.00 | 10 | — | r-PP | $T_1 > T_2$ | 7.2 | B | B |
| Example 231 | 1.00 | 0.2 | — | b-PP | $T_1 < T_2$ | 7.5 | B | A |
| Example 232 | 1.00 | 0.2 | — | b-PP | $T_1 < T_2$ | 6.7 | B | A |
| Example 233 | 5.00 | 1 | — | b-PP | $T_1 < T_2$ | 6.7 | B | A |
| Example 234 | 10.00 | 10 | — | b-PP | $T_1 < T_2$ | 6.9 | B | A |
| Example 235 | 0.25 | 0.05 | — | b-PP | $T_1 < T_2$ | 5.3 | A | A |
| Example 236 | 1.00 | 0.2 | — | b-PP | $T_1 < T_2$ | 5.4 | A | A |
| Example 237 | 5.00 | 1 | — | b-PP | $T_1 < T_2$ | 5.6 | A | A |
| Example 238 | 10.00 | 10 | — | b-PP | $T_1 < T_2$ | 5.9 | A | A |
| Example 239 | 0.25 | 0.05 | — | b-PP | $T_1 < T_2$ | 6.6 | B | A |
| Example 240 | 5.00 | 1 | — | b-PP | $T_1 < T_2$ | 6.8 | B | A |
| Example 241 | 10.00 | 10 | — | b-PP | $T_1 < T_2$ | 7.0 | B | A |
| Comparative Example 201 | — | — | — | r-PP | $T_1 > T_2$ | 12.6 | D | D |
| Comparative Example 202 | — | — | — | r-PP | $T_1 = T_2$ | 10.8 | D | C |
| Comparative Example 203 | — | — | — | r-PP | $T_1 > T_2$ | 11.1 | D | C |

As clearly shown in the results described in Table 7 and Table 8, it has been confirmed that according to the liquid-repellent laminates in Examples 201 to 241, the liquid repellency can be more improved in comparison with the liquid-repellent laminates in Comparative Examples 201 to 203.

REFERENCE SIGNS LIST

1, 2: LIQUID-REPELLENT LAMINATE, 10: LIQUID-REPELLENT FILM, 11: LIQUID-REPELLENT LAYER, 12: SECOND RESIN LAYER, 13: ADHESIVE, 14: BASE MATERIAL, 51: SEAL 10 PART, 54: OIL DISPERSED IN WATER-TYPE LIQUID, 56: CONTAINER, 57: SCALE, 100: SAMPLE FOR EVALUATION OF LIQUID-REPELLENT LAMINATE

The invention claimed is:

1. A liquid-repellent layer forming resin composition comprising:
    a polypropylene resin (A); and
    at least one silylated polyolefin (B) selected from the group consisting of polyethylene-silicone block copolymers,
        wherein the polypropylene resin (A) has two or more endothermic peaks in the range of 130 to 170° C. in a melting curve in a second heating process obtained under measurement conditions where the following steps (1) to (5) are carried out sequentially, in differential scanning calorimetry of a measurement specimen of a liquid-repellent layer formed by using the liquid-repellent layer forming resin composition:
(1) heating to 200° C. at a heating rate of 10° C./min, as a first heating process;
(2) retaining at 200° C. for 5 minutes;
(3) cooling to 0° C. at a cooling rate of 100° C./min;
(4) retaining at 0° C. for 5 minutes; and
(5) heating to 200° C. at a heating rate of 10° C./min, as the second heating process,
wherein the polypropylene resin (A) comprises a random polypropylene resin (A1) and a block polypropylene resin (A2) with a mass ratio (Mass of random polypropylene resin (A1)/Mass of block polypropylene resin (A2)) in the range of 35/65 to 65/35, and
wherein the block polypropylene resin (A2) has a melting point higher than that of the random polypropylene resin (A1) by 10° C. or more.

2. The resin composition according to claim 1, wherein the resin composition has a difference of 10° C. or more between a peak temperature of the endothermic peak on the highest temperature side and a peak temperature of the endothermic peak on the lowest temperature side in the range of 130 to 170° C. in the melting curve in the second heating process.

3. The resin composition according to claim 1, wherein the polypropylene resin (A) has one or more endothermic peaks in the range of 130° C. or more and less than 150° C., and one or more endothermic peaks in the range of 150° C. or more and 170° C. or less, in the melting curve in the second heating process.

4. The resin composition according to claim 1, further comprising a compatibilizer (C) having a site compatible with the polypropylene resin (A) and a site compatible with the silylated polyolefin (B).

5. The resin composition according to claim 4, wherein the compatibilizer (C) comprises at least one selected from the group consisting of a block copolymer of propylene and ethylene and a block copolymer of ethylene and an ethylene-butylene copolymer.

6. The resin composition according to claim 1, wherein the mass ratio (Mass of random polypropylene resin (A1)/Mass of block polypropylene resin (A2)) is in the range of 40/60 to 60/40.

* * * * *